United States Patent
Choi et al.

(10) Patent No.: US 11,758,505 B2
(45) Date of Patent: Sep. 12, 2023

(54) GROUP-BASED PRS BROADCAST FOR SIDELINK POSITIONING

(71) Applicant: QUALCOMM Incorporated, San Diego, CA (US)

(72) Inventors: Chang-Sik Choi, Seoul (KR); Kapil Gulati, Belle Mead, NJ (US); Gene Wesley Marsh, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 146 days.

(21) Appl. No.: 17/387,874

(22) Filed: Jul. 28, 2021

(65) Prior Publication Data
US 2022/0039052 A1    Feb. 3, 2022

Related U.S. Application Data

(60) Provisional application No. 63/059,756, filed on Jul. 31, 2020.

(51) Int. Cl.
*H04W 64/00* (2009.01)
*H04L 5/00* (2006.01)
*H04W 92/18* (2009.01)

(52) U.S. Cl.
CPC ......... *H04W 64/003* (2013.01); *H04L 5/0051* (2013.01); *H04W 92/18* (2013.01)

(58) Field of Classification Search
CPC ... H04W 64/00; H04W 64/003; H04W 92/18; H04W 8/186; H04W 4/06; H04W 4/40;
(Continued)

(56) References Cited

U.S. PATENT DOCUMENTS

| | | | | |
|---|---|---|---|---|
| 2022/0349978 | A1* | 11/2022 | Baek | H04W 92/18 |
| 2022/0365163 | A1* | 11/2022 | Baek | H04W 64/00 |
| 2022/0397633 | A1* | 12/2022 | Baek | H04L 5/00 |

FOREIGN PATENT DOCUMENTS

| | | |
|---|---|---|
| WO | WO-2020007126 A1 | 1/2020 |
| WO | WO-2020072171 A1 | 4/2020 |

OTHER PUBLICATIONS

3GPP TS 43.059: "3rd Generation Partnership Project, Technical Specification Group Radio Access Network, Functional Stage 2 Description of Location Services (LCS) in GERAN (Release 16)", 3GPP Standard, Technical Specification, 3rd Generation Partnership Project (3GPP), Mobile Competence Centre, 650, Route Des Lucioles, F-06921 Sophia-Antipolis Cedex, France, vol. RAN WG6, No. V16.0.0 (Jul. 2020), Jul. 19, 2020 (Jul. 19, 2020), pp. 1-83, XP051925557, Retrieved from the Internet: URL: ftp://ftp.3gpp.org/Specs/archive/43_series/43.059/43059-g00.zip 43059-g00.doc [retrieved on Jul. 19, 2020] abstract, Section "5.3.3 Positioning group", Section "5.2 High-Level Functions", Section "5.3.2.3 Location System Broadcast Function (LSBcF)".

(Continued)

*Primary Examiner* — Siu M Lee
(74) *Attorney, Agent, or Firm* — Loza & Loza LLP

(57) ABSTRACT

Aspects relate to group-based positioning reference signal (PRS) broadcast in a wireless communication network. Wireless communication devices communicating over a sidelink channel in the wireless communication network may be grouped into one or more positioning groups. Within each positioning group, a respective order of the wireless communication devices in the positioning group may be identified. The wireless communication devices in a positioning group may then communicate PRSs therebetween over the sidelink channel based on the order of wireless communication devices in the positioning group.

29 Claims, 20 Drawing Sheets

(58) Field of Classification Search
CPC . H04L 5/0051; H04L 5/0091; G01S 2205/01; G01S 13/765; G01S 13/878; G01S 5/0205
See application file for complete search history.

(56) References Cited

OTHER PUBLICATIONS

International Search Report and Written Opinion—PCT/US2021/043640—ISA/EPO—dated Nov. 12, 2021.

* cited by examiner

| Field | Initiator | Anchor | Power | ID (mod N) |
|---|---|---|---|---|
| Value | {0, 1} | {0, 1} | {0, 1} | {0, 1, ..., N} |

Basic Fields 702 — 704, 706, 708, 710

| Field | Basic Fields | | | | Responder Fields | |
|---|---|---|---|---|---|---|
| | Initiator | Anchor | Power | ID (mod N) | Initiator ID | Responder ID(s) |
| Value | {0, 1} | {0, 1} | {0, 1} | {0, 1, ..., N} | ID (mod N)+UE ID | ID (mod N)+UE ID |

| Field | Basic Fields | | | Responder Field |
|---|---|---|---|---|
| | Initiator | Anchor | Power | ID (mod N) | Responder ID(s) |
| Value | {0, 1} | {0, 1} | {0, 1} | {0, 1, ..., N} | ID (mod N)+UE ID |

900 — 902 Basic Fields — 904 Responder Field — 906 Initiator — 908 Anchor — 910 Power — 912 ID (mod N) — 914 Responder ID(s)

FIG. 9

GROUP-BASED PRS BROADCAST FOR SIDELINK POSITIONING

CROSS-REFERENCE TO RELATED APPLICATIONS

The present Application for Patent claims priority to and the benefit of U.S. Provisional Application No. 63/059,756, filed Jul. 31, 2020, and assigned to the assignee hereof and hereby expressly incorporated by reference herein as if fully set forth below in its entirety and for all applicable purposes.

TECHNICAL FIELD

The technology discussed below relates generally to wireless communication networks, and more particularly, to broadcasting positioning reference signals (PRSs) in sidelink networks.

INTRODUCTION

Wireless communication between devices may be facilitated by various network configurations. In one configuration, a cellular network may enable user equipment (UEs) to communicate with one another through signaling with a nearby base station or cell. Another wireless communication network configuration is a device to device (D2D) network in which UEs may signal one another directly, rather than via an intermediary base station or cell. For example, D2D communication networks may utilize sidelink signaling to facilitate the direct communication between UEs. In some sidelink network configurations, UEs may further communicate in a cellular network, generally under the control of a base station. Thus, the UEs may be configured for uplink and downlink signaling via a base station and further for sidelink signaling directly between the UEs without transmissions passing through the base station.

One example of a sidelink wireless communication network is a vehicle-to-everything (V2X) communication network. V2X communication involves the exchange of information not only between vehicles themselves, but also between vehicles and external systems, such as streetlights, buildings, pedestrians, and cellular communication networks. V2X systems enable vehicles to obtain information related to the weather, nearby accidents, road conditions, activities of nearby vehicles and pedestrians, objects nearby the vehicle, and other pertinent information that may be utilized to improve the vehicle driving experience, increase vehicle safety, and support autonomous vehicles.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a method of wireless communication at a first wireless communication device is disclosed. The method includes broadcasting a first group formation message over a sidelink channel to form a positioning group including a plurality of wireless communication devices including the first wireless communication device. The method further includes communicating positioning reference signals (PRSs) between the plurality of wireless communication devices in the positioning group over the sidelink channel based on an order of the plurality of wireless communication devices in the positioning group.

Another example provides a first wireless communication device in a wireless communication network. The wireless communication device includes a wireless transceiver, a memory, and a processor communicatively coupled to the wireless transceiver and the memory. The processor and the memory may be configured to broadcast a first group formation message over a sidelink channel via the wireless transceiver to form a positioning group including a plurality of wireless communication devices including the first wireless communication device. The processor and the memory may further be configured communicate positioning reference signals (PRSs) between the plurality of wireless communication devices in the positioning group over the sidelink channel via the wireless transceiver based on an order of the plurality of wireless communication devices in the positioning group.

Another example provides a first wireless communication device in a wireless communication network. The wireless communication device includes means for broadcasting a first group formation message over a sidelink channel to form a positioning group including a plurality of wireless communication devices including the first wireless communication device. The first wireless communication device further includes means for communicating positioning reference signals (PRSs) between the plurality of wireless communication devices in the positioning group over the sidelink channel based on an order of the plurality of wireless communication devices in the positioning group.

Another example provides an article of manufacture for use by a first wireless communication device in a wireless communication network. The article includes a computer-readable medium having stored therein instructions executable by one or more processors of the first wireless communication device to broadcast a first group formation message over a sidelink channel to form a positioning group including a plurality of wireless communication devices including the first wireless communication device, and communicate positioning reference signals (PRSs) between the plurality of wireless communication devices in the positioning group over the sidelink channel based on an order of the plurality of wireless communication devices in the positioning group.

These and other aspects will become more fully understood upon a review of the detailed description, which follows. Other aspects, features, and examples will become apparent to those of ordinary skill in the art, upon reviewing the following description of specific, exemplary examples of in conjunction with the accompanying figures. While features may be discussed relative to certain examples and figures below, all examples can include one or more of the advantageous features discussed herein. In other words, while one or more examples may be discussed as having certain advantageous features, one or more of such features may also be used in accordance with the various examples discussed herein. In similar fashion, while exemplary examples may be discussed below as device, system, or method examples such exemplary examples can be implemented in various devices, systems, and methods.

BRIEF DESCRIPTION OF THE DRAWINGS

FIG. 7 is a diagram illustrating an example of a group formation message transmitted by a group initiator according to some aspects.

FIG. 8 is a diagram illustrating an example of a group formation message transmitted by a group responder according to some aspects.

FIG. 9 is a diagram illustrating an example of a group association message transmitted by the group initiator according to some aspects.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Figure 1:
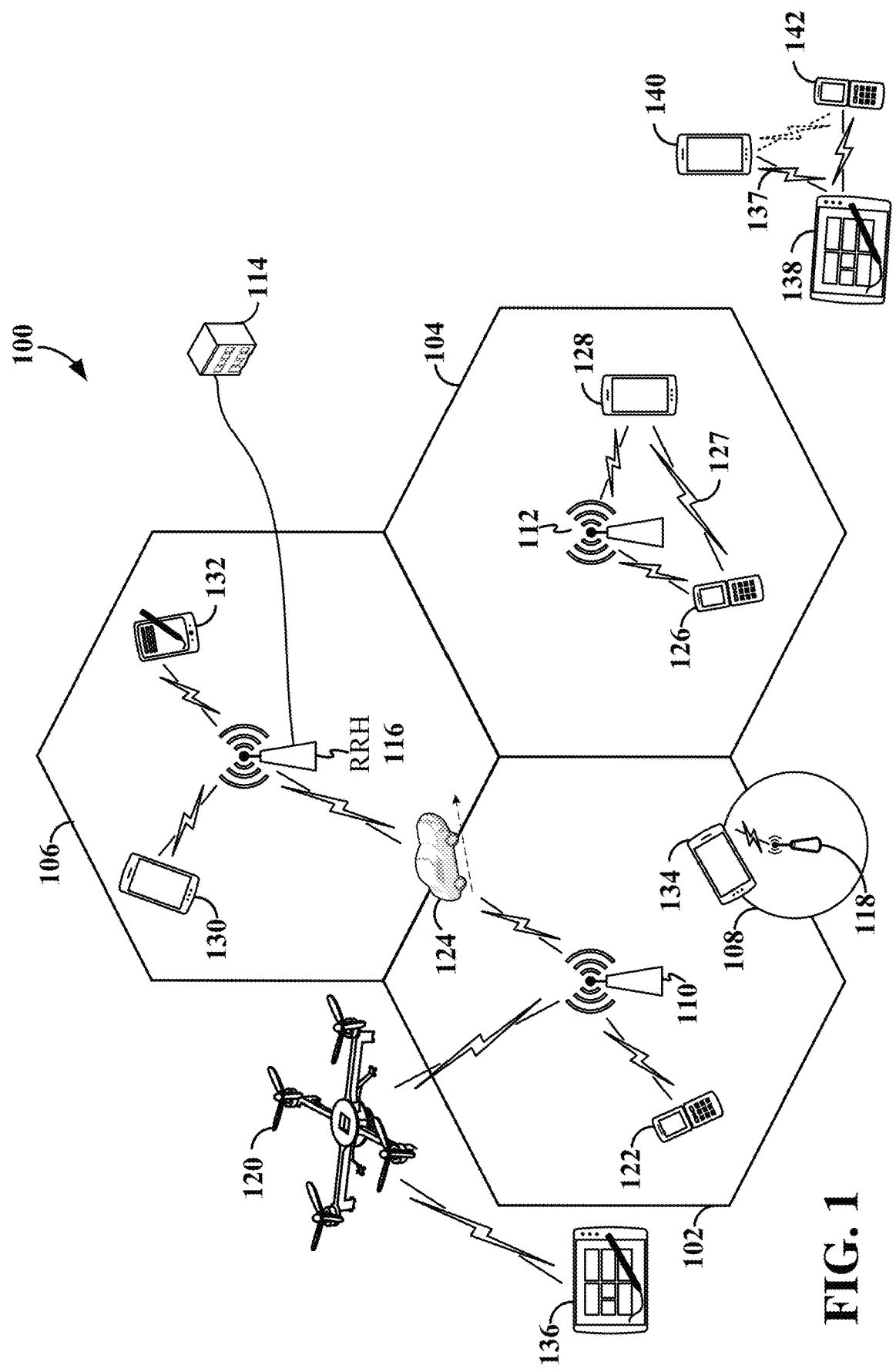
FIG. 1 is a diagram illustrating an example of a wireless radio access network according to some aspects.

The various concepts presented throughout this disclosure may be implemented across a broad variety of telecommunication systems, network architectures, and communication standards. Referring now to FIG. 1, as an illustrative example without limitation, a schematic illustration of a radio access network 100 is provided. The RAN 100 may implement any suitable wireless communication technology or technologies to provide radio access. As one example, the RAN 100 may operate according to $3^{rd}$ Generation Partnership Project (3GPP) New Radio (NR) specifications, often referred to as 5G. As another example, the RAN 100 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

The geographic region covered by the radio access network 100 may be divided into a number of cellular regions (cells) that can be uniquely identified by a user equipment (UE) based on an identification broadcasted over a geographical area from one access point or base station. FIG. 1 illustrates cells 102, 104, 106, and cell 108, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a respective base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 100 operates according to both the LTE and 5G NR standards, one of the base stations may be an LTE base station, while another base station may be a 5G NR base station.

Various base station arrangements can be utilized. For example, in FIG. 1, two base stations 110 and 112 are shown in cells 102 and 104; and a third base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the base stations 110, 112, and 114 support cells having a large size. Further, a base station 118 is shown in the cell 108 which may overlap with one or more macrocells. In this example, the cell 108 may be referred to as a small cell (e.g., a microcell, picocell, femtocell, home base station, home Node B, home eNode B, etc.), as the base station 118 supports a cell having a relatively small size. Cell sizing can be done according to system design as well as component constraints.

It is to be understood that the radio access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes an unmanned aerial vehicle (UAV) 120, which may be a drone or quadcopter. The UAV 120 may be configured to function as a base station, or more specifically as a mobile base station. That is, in some examples, a cell may not necessarily be stationary, and the geographic area of the cell may move according to the location of a mobile base station such as the UAV 120.

In general, base stations may include a backhaul interface for communication with a backhaul portion (not shown) of the network. The backhaul may provide a link between a base station and a core network (not shown), and in some examples, the backhaul may provide interconnection between the respective base stations. The core network may be a part of a wireless communication system and may be independent of the radio access technology used in the radio access network. Various types of backhaul interfaces may be employed, such as a direct physical connection, a virtual network, or the like using any suitable transport network.

The RAN 100 is illustrated supporting wireless communication for multiple mobile apparatuses. A mobile apparatus is commonly referred to as a user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the RAN 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with base station 118; and UE 136 may be in communication with mobile base station 120. Here, each base station 110, 112, 114, 118, and 120 may be configured to provide an access point to a core network (not shown) for all the UEs in the respective cells. In some examples, the UAV 120 (e.g., the quadcopter) can be a mobile network node and may be configured to function as a UE. For example, the UAV 120 may operate within cell 102 by communicating with base station 110.

Wireless communication between a RAN 100 and a UE (e.g., UE 122 or 124) may be described as utilizing an air interface. Transmissions over the air interface from a base station (e.g., base station 110) to one or more UEs (e.g., UE 122 and 124) may be referred to as downlink (DL) transmissions. In accordance with certain aspects of the present disclosure, the term downlink may refer to a point-to-multipoint transmission originating at a scheduling entity (described further below; e.g., base station 110). Another way to describe this scheme may be to use the term broadcast channel multiplexing. Transmissions from a UE (e.g., UE 122) to a base station (e.g., base station 110) may be referred to as uplink (UL) transmissions. In accordance with further aspects of the present disclosure, the term uplink may refer to a point-to-point transmission originating at a scheduled entity (described further below; e.g., UE 122).

For example, DL transmissions may include unicast or broadcast transmissions of control information and/or traffic information (e.g., user data traffic) from a base station (e.g., base station 110) to one or more UEs (e.g., UEs 122 and 124), while UL transmissions may include transmissions of control information and/or traffic information originating at a UE (e.g., UE 122). In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

The air interface in the RAN 100 may utilize one or more multiplexing and multiple access algorithms to enable simultaneous communication of the various devices. For example, 5G NR specifications provide multiple access for UL or reverse link transmissions from UEs 122 and 124 to base station 110, and for multiplexing DL or forward link transmissions from the base station 110 to UEs 122 and 124 utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the air interface in the RAN 100 may utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

In the RAN 100, the ability for a UE to communicate while moving, independent of their location, is referred to as mobility. The various physical channels between the UE and the RAN are generally set up, maintained, and released under the control of an access and mobility management function (AMF). In some scenarios, the AMF may include a security context management function (SCMF) and a security anchor function (SEAF) that performs authentication. The SCMF can manage, in whole or in part, the security context for both the control plane and the user plane functionality.

In some examples, the RAN 100 may enable mobility and handovers (i.e., the transfer of a UE's connection from one radio channel to another). For example, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 (illustrated as a vehicle, although any suitable form of UE may be used) may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In various implementations, the air interface in the RAN 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. An example of unlicensed spectrum includes the Intelligent Transport Systems (ITS) band in the 5.9 GHz frequency band. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In some examples, access to the air interface may be scheduled, wherein a scheduling entity (e.g., a base station) allocates resources (e.g., time-frequency resources) for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). For example, two or more UEs (e.g., UEs 138, 140, and 142) may communicate with each other using sidelink signals 137 without relaying that communication through a base station. In some examples, the UEs 138, 140, and 142 may each function as a scheduling entity or transmitting sidelink device and/or a scheduled entity or a receiving sidelink device to schedule resources and communicate sidelink signals 137 therebetween without relying on scheduling or control information from a base station. In other examples, two or more UEs (e.g., UEs 126 and 128) within the coverage area of a base station (e.g., base station 112) may also communicate sidelink signals 127 over a direct link (sidelink) without conveying that communication through the base station 112. In this example, the base station 112 may allocate resources to the UEs 126 and 128 for the sidelink communication. In either case, such sidelink signaling 127 and 137 may be implemented in a peer-to-peer (P2P) network, a device-to-device (D2D) network, a vehicle-to-vehicle (V2V) network, a vehicle-to-everything (V2X) network, a mesh network, or other suitable direct link network.

In some examples, a D2D relay framework may be included within a cellular network to facilitate relaying of communication to/from the base station 112 via D2D links (e.g., sidelinks 127 or 137). For example, one or more UEs (e.g., UE 128) within the coverage area of the base station 112 may operate as relaying UEs to extend the coverage of the base station 112, improve the transmission reliability to one or more UEs (e.g., UE 126), and/or to allow the base station to recover from a failed UE link due to, for example, blockage or fading.

Two primary technologies that may be used by V2X networks include dedicated short range communication (DSRC) based on IEEE 802.11p standards and cellular V2X based on LTE and/or 5G (New Radio) standards. Various aspects of the present disclosure may relate to New Radio (NR) cellular V2X networks, referred to herein as V2X networks, for simplicity. However, it should be understood that the concepts disclosed herein may not be limited to a particular V2X standard or may be directed to sidelink or D2D networks other than V2X networks.

Figure 2:
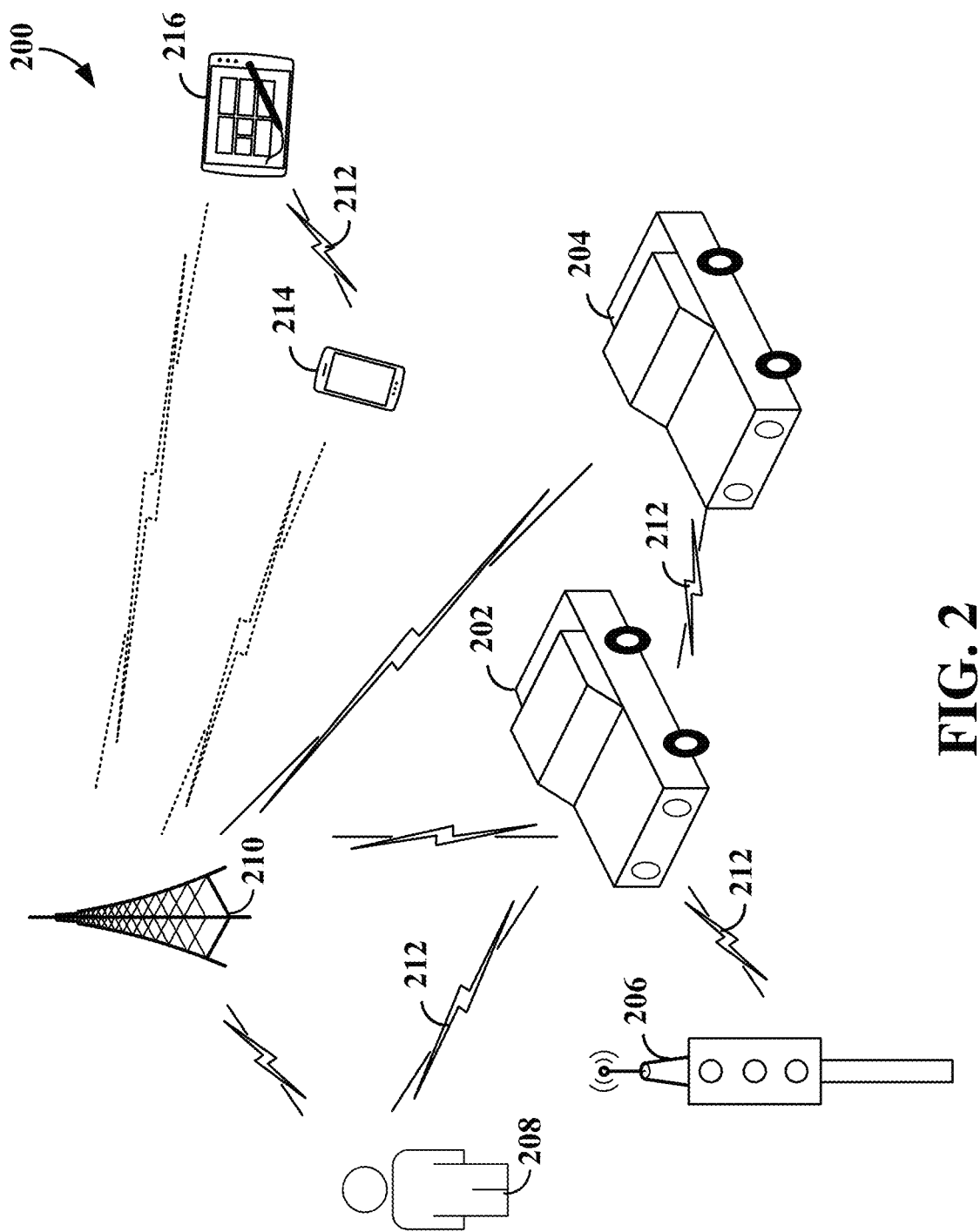
FIG. 2 is a diagram illustrating an example of a wireless communication network employing sidelink communication according to some aspects.

FIG. 2 illustrates an example of a wireless communication network 200 configured to support D2D or sidelink communication. In some examples, sidelink communication may include V2X communication. V2X communication involves the wireless exchange of information directly between not only vehicles (e.g., vehicles 202 and 204) themselves, but also directly between vehicles 202/204 and infrastructure 206 (e.g., roadside units (RSUs)), such as streetlights, buildings, traffic cameras, tollbooths or other stationary objects, vehicles 202/204 and pedestrians 208, and vehicles 202/204 and cellular networks (e.g., base station 210). In some examples, V2X communication may be implemented in accordance with the New Radio (NR) cellular V2X standard defined by 3GPP, Release 15 or 16, or other suitable standard.

V2X communication enable vehicles 202 and 204 to obtain information related to the weather, nearby accidents, road conditions, activities of nearby vehicles and pedestrians, objects nearby the vehicle, and other pertinent information that may be utilized to improve the vehicle driving experience and increase vehicle safety. For example, such V2X data may enable autonomous driving and improve road safety and traffic efficiency. For example, the exchanged V2X data may be utilized by a V2X connected vehicle 202 and 204 to provide in-vehicle collision warnings, road hazard warnings, approaching emergency vehicle warnings, pre-/post-crash warnings and information, emergency brake warnings, traffic jam ahead warnings, lane change warnings, intelligent navigation services, and other similar information. In addition, V2X data received by a V2X connected mobile device of a pedestrian/cyclist 208 may be utilized to trigger a warning sound, vibration, flashing light, etc., in case of imminent danger.

The sidelink communication between vehicle-UEs (V-UEs) 202 and 204 or between a V-UE 202 or 204 and either an RSU 206 or a pedestrian-UE (P-UE) 208 occurs over a sidelink channel 212. In some examples, the sidelink channel 212 may support a proximity service (ProSe) PC5 interface. In various aspects of the disclosure, the sidelink channel 212 implementing a PC5 interface may further be utilized to support D2D communication in other proximity use cases. Examples of other proximity use cases may include smart wearables, public safety, or commercial (e.g., entertainment, education, office, medical, and/or interactive) based proximity services. In the example shown in FIG. 2, ProSe communication may further occur between UEs 214 and 216.

ProSe communication may support different operational scenarios, such as in-coverage, out-of-coverage, and partial coverage. Out-of-coverage refers to a scenario in which UEs (e.g., UEs 214 and 216) are outside of the coverage area of a base station (e.g., base station 210), but each are still configured for ProSe communication. Partial coverage refers to a scenario in which some of the UEs (e.g., V-UE 204) are outside of the coverage area of the base station 210, while other UEs (e.g., V-UE 202 and P-UE 208) are in communication with the base station 210. In-coverage refers to a scenario in which UEs (e.g., V-UE 202 and P-UE 208) are in communication with the base station 210 (e.g., gNB) via a Uu (e.g., cellular interface) connection to receive ProSe service authorization and provisioning information to support ProSe operations.

To facilitate D2D sidelink communication between, for example, UEs 214 and 216 over the sidelink 212, the UEs 214 and 216 may transmit discovery signals therebetween. In some examples, each discovery signal may include a synchronization signal, such as a primary synchronization signal (PSS) and/or a secondary synchronization signal (SSS) that facilitates device discovery and enables synchronization of communication on the sidelink 212. For example, the discovery signal may be utilized by the UE 216 to measure the signal strength and channel status of a potential sidelink (e.g., sidelink 212) with another UE (e.g., UE 214). The UE 216 may utilize the measurement results to select a UE (e.g., UE 214) for sidelink communication or relay communication.

In any of the above operational scenarios, the various mobile sidelink devices (e.g., V-UEs 202 and 204, P-UE 208, and other mobile sidelink devices communicating over the sidelink channel 212) may determine their location (e.g., geographical coordinates) in the sidelink network 200 using a sidelink positioning mechanism. To support sidelink positioning, positioning reference signals (PRSs) may be transmitted between the RSUs 206, V-UEs 202 and 204 and P-UEs 208. In some examples, the PRSs may be sequence-based signals and may further be transmitted over unlicensed spectrum (e.g., the ITS band) or licensed spectrum.

Depending on the capabilities of the mobile sidelink devices (e.g., V-UEs 202/204 and P-UE 208), the respective location of each mobile sidelink device may be determined using sidelink-based (SL-b) positioning or sidelink-assisted (SL-a) positioning. In SL-b positioning, each mobile sidelink device computes their own location in a distributed manner using the broadcast PRSs. In SL-a positioning, the RSU 206 or other server in the network computes the locations of mobile sidelink devices. In either SL-a positioning or SL-b positioning, the location of a mobile sidelink device (e.g., V-UE 202) may be determined based on the TDoA between PRSs broadcast between the V-UE 202 and at least one other sidelink device (e.g., RSU 206).

Figure 3:
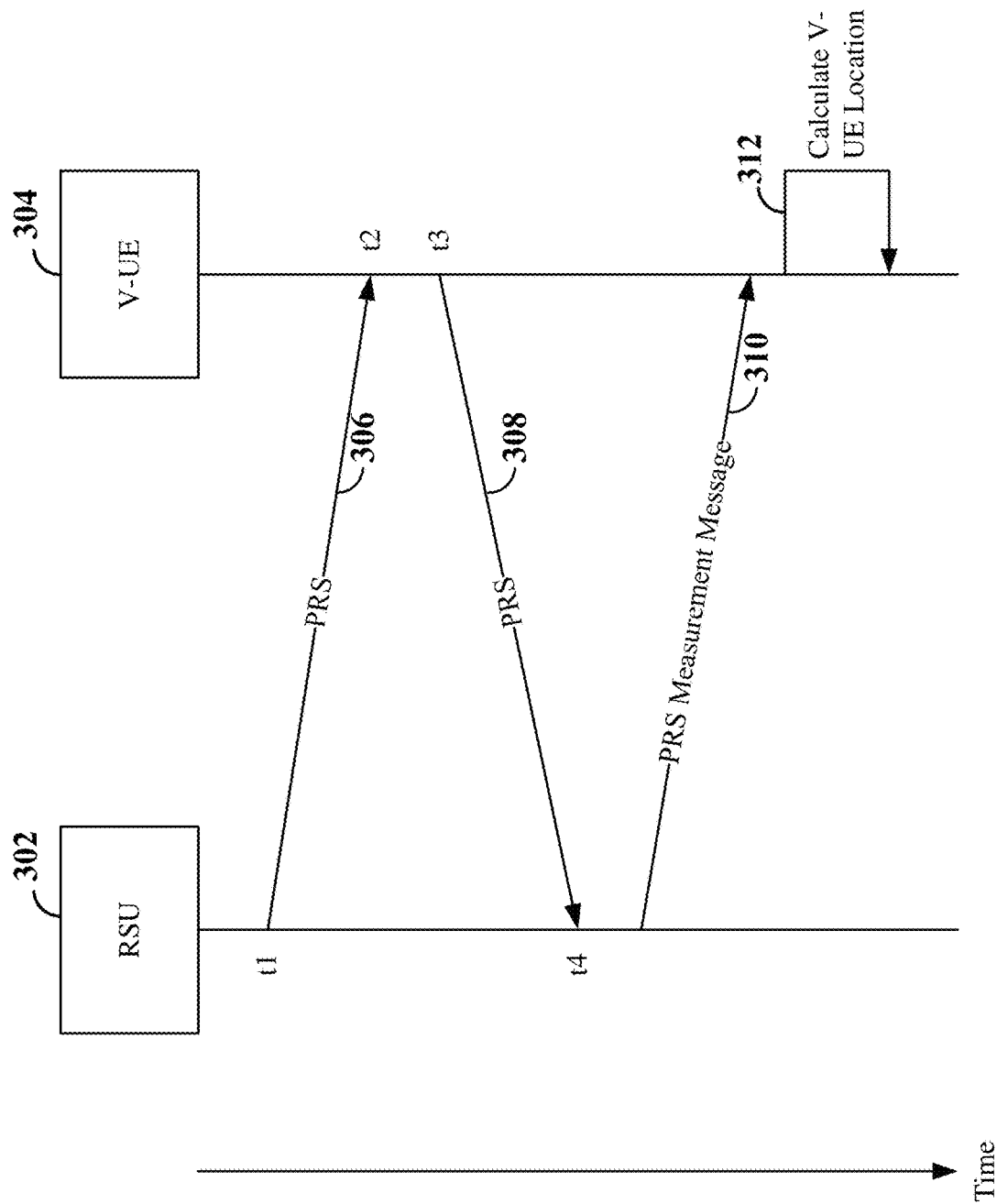
FIG. 3 is a signaling diagram illustrating an example of sidelink-based positioning according to some aspects.

FIG. 3 is a signaling diagram illustrating an example of sidelink-based (SL-b) positioning according to some aspects. In the example shown in FIG. 3, a V-UE 304 is shown communicating with an RSU 302 over a sidelink channel. In some examples, the sidelink channel may include unlicensed spectrum (e.g., the ITS frequency band). The V-UE 304 may correspond, for example, to any of the V-UEs 202 or 204 shown in FIG. 2. In addition, the RSU 302 may correspond, for example, to the RSU 206 shown in FIG. 2. It should be understood that the signaling diagram shown in FIG. 3 may be implemented between any two wireless communication devices (e.g., RSU, V-UE, P-UE, etc.), and may further be implemented between more than two wireless communication devices (e.g., between the V-UE 304 and multiple RSUs 302, between one or more RSUs and one or more P-UEs or V-UEs, and/or between the V-UE and two or more other V-UEs or P-UEs).

FIG. 3 depicts the transmission and reception of signals over time. For example, at 306, the RSU 302 broadcasts a first PRS over the sidelink channel at an initial time (t1). The first PRS may include, for example, a PRS sequence. The PRS sequence may be a wideband random sequence that is broadcast over an unlicensed frequency band. In some examples, the PRS may include a sequence identifier (ID) identifying the PRS sequence. The first PRS may be received at the V-UE 304 at a second time (t2) subsequent to t1. At 308, the V-UE 304 broadcasts a second PRS over the sidelink channel at a third time (t3), which is received at the RSU 302 at a fourth time (t4).

In order for the V-UE 304 to be able to compute its location based on the TDoA of the first and second PRSs, at 310, the RSU 302 transmits a PRS measurement message including various positioning information to the V-UE 304 over the sidelink channel. For example, the positioning information included in a payload of the PRS measurement message may include the time of departure (t1) of the first PRS and the time of arrival (t4) of the second PRS. Other positioning information may include the PRS sequence ID, clock error noise standard deviation of the RSU 302, clock drift standard deviation of the RSU 302, location of the RSU 302 and other suitable information. The PRS measurement message may further include the respective UE IDs (e.g., Layer 2 (L2) medium access control (MAC) IDs) of the RSU 302 and V-UE 304.

At 312, the V-UE 304 may calculate its location based on the positioning information included in the PRS measurement message, the time of arrival (t2) of the first PRS, the time of departure (t3) of the second PRS, and the clock error (e.g., clock drift standard deviation and clock error noise standard deviation) of the V-UE 304 determined using its own Kalman filter. For example, the location ($z_n$) of the V-UE 304 may be computed as:

$$z_n = (t_4 - t_3) + (t_2 - t_1) = \frac{\|r - x(t_n)\|}{v_{light}} + a, \quad \text{(Equation 1)}$$

where $v_{light}$ is the speed of light, a is an adjustment parameter based on the clock error of the RSU 302 and V-UE 304, r is the location of the RSU 302 and x is unknown.

In examples in which SL-a positioning is utilized, the V-UE 304 can transmit a PRS measurement message to the RSU 302 including, for example, the time of arrival (t2) of the first PRS, the time of departure (t3) of the second PRS, and other positioning information, such as the clock error of the V-UE 304, speed of the V-UE 304, and location of the V-UE 304 at the time of PRS broadcast (if known).

Figure 4:
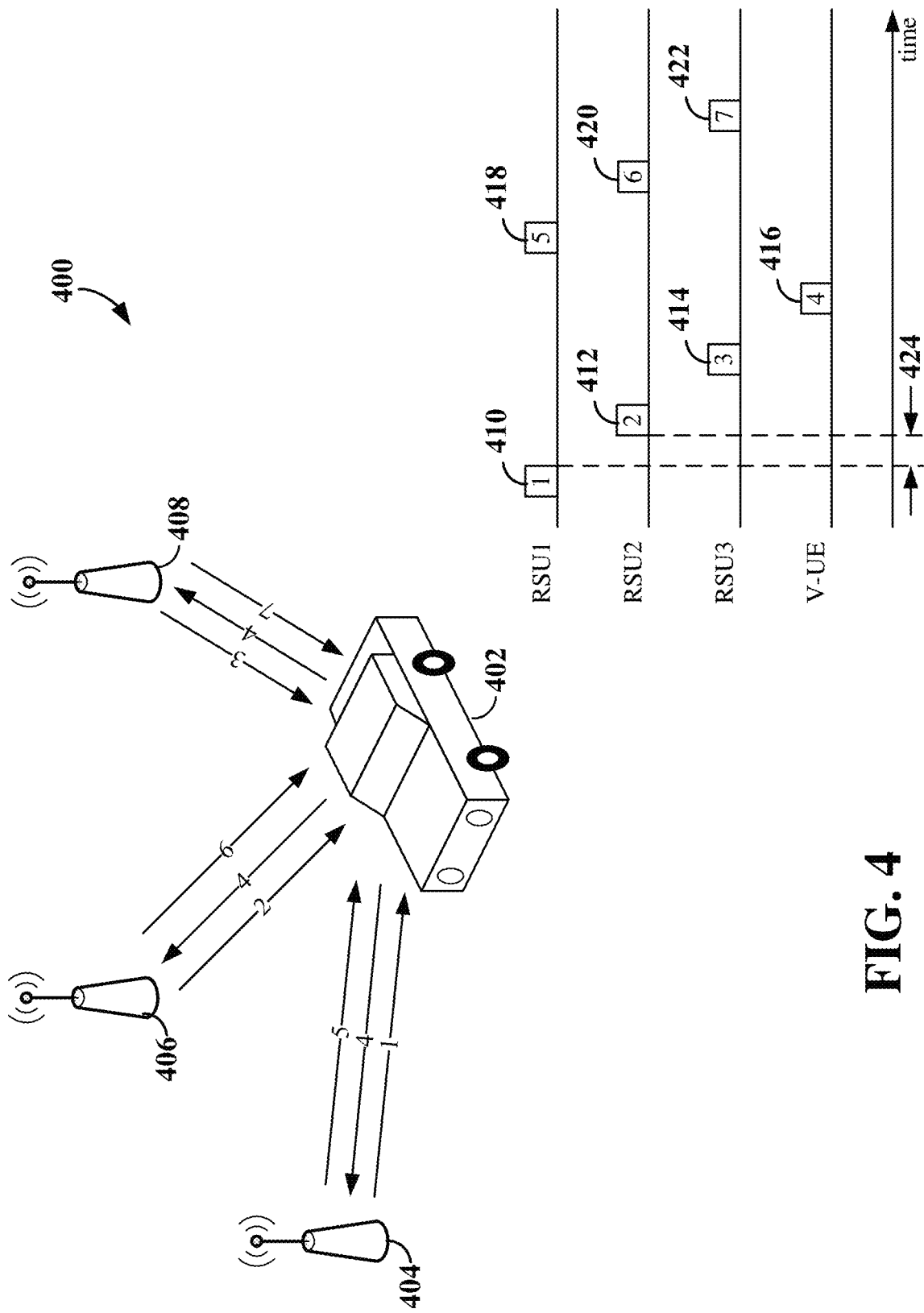
FIG. 4 is a diagram illustrating an example of communication of positioning reference signals (PRSs) in a sidelink communication network according to some aspects.

FIG. 4 is a diagram illustrating an example of communication of positioning reference signals (PRSs) in a sidelink communication network 400 according to some aspects. In the example shown in FIG. 4, a V-UE 402 is shown in wireless communication with a plurality of RSUs 404, 406, and 408 over a sidelink channel. In some examples, the sidelink channel may include unlicensed spectrum (e.g., the ITS frequency band). The V-UE 402 may correspond, for example, to any of the V-UEs shown in FIG. 2 and/or FIG. 3. In addition, the RSUs 404, 406, and 408 may correspond, for example, to any of the RSUs shown in FIG. 2 and/or FIG. 3. It should further be understood that, in some examples, the V-UE 402 may be a P-UE or other mobile sidelink device. In addition, one or more of the RSUs 404, 406, and 408 may be other V-UEs, P-UEs, and/or other mobile sidelink devices.

FIG. 4 further illustrates the PRS communication between the V-UE 402 and the RSUs 404, 406, and 408 over time. For example, a first PRS 410 (denoted signal 1) may be broadcast from the RSU 404, followed by a second PRS 412 (denoted signal 2) broadcast from the RSU 406, followed by a third PRS 414 (denoted signal 3) broadcast by the RSU 408, followed by a fourth PRS 416 (denoted signal 4) broadcast by the V-UE 402. Upon receipt of the fourth PRS 416 by each of the RSUs 404, 406, and 408, each of the RSUs 404, 406, and 408 may then transmit a respective PRS measurement signal 418, 420, and 422 (denoted signals 5, 6, and 7) to the V-UE 402. The V-UE 402 may then calculate its location based on the PRS measurement signals 418, 420, and 422, time of departure of the fourth PRS 416, and the respective time of arrivals at the V-UE 402 of the other PRSs 410, 412, and 414, as discussed above.

The efficiency and accuracy of SL-b positioning (or SL-a positioning) depends on the latency (e.g., time gap 424) between the PRSs 410, 412, 414, and 416. When implementing listen-before-talk (LBT) or another channel sensing mechanism to access the sidelink channel, the availability of the sidelink channel to each wireless communication device (e.g., V-UE 402, RSU 404, RSU 406, and RSU 408) may vary, thus impacting the PRS latency.

Therefore, in various aspects of the disclosure, the wireless communication devices (e.g., V-UEs, P-UEs, RSUs, etc.) communicating over a sidelink channel in a sidelink wireless communication network may be grouped into one or more positioning groups. Within each positioning group, a respective order of the wireless communication devices in the positioning group may be identified. The wireless communication devices in a particular positioning group (e.g., the positioning group members) may then communicate PRSs therebetween over the sidelink channel based on the determined order of wireless communication devices. For example, the sidelink channel may be reserved for a channel occupancy time (CoT) within which each of the wireless communication devices in the positioning group may broadcast PRSs in the positioning group and communicate PRS measurement messages to other positioning group members, thus reducing the PRS latency.

In some examples, the wireless communication devices may be configured to form positioning groups by broadcasting group formation messages over the sidelink channel. One of the wireless communication devices in each positioning group may be considered an initiator device that initiates the positioning group, while the other wireless communication devices in the positioning group may be considered responder devices. For example, an initiator device may broadcast an initiator (or first) group formation message to form a positioning group. Other wireless communication devices that receive the initiator group formation message may then respond with subsequent responder group formation messages that identify the initiator device and other responder devices that previously responded to the first group formation message. Thus, the responder group formation messages may build on one another such that the last responder group formation message identifies the initiator device and all of the other responder devices in the positioning group.

The initiator device may then determine the order of wireless communication devices in the positioning group from each of the responder group formation messages and transmit (e.g., broadcast or groupcast) a group association message that identifies the members of the positioning group and the order thereof. The initiator device may then reserve the sidelink channel for a CoT based on the number of wireless communication devices in the positioning group and broadcast the first PRS during the CoT. Responder devices may then each broadcast their respective PRS within the CoT based on the order of wireless communication devices. Thus, the respective transmission timing of each of the PRSs from each of the wireless communication devices in the positioning group may be determined from the order.

In some examples, LBT may be used to reserve the sidelink channel. For example, the initiator device (e.g., RSU, V-UE, P-UE, etc.) may conduct an LBT procedure to determine whether it can reserve the sidelink channel. In some aspects, an LBT procedure may involve sensing energy on the channel and comparing the energy to an energy detection (ED) threshold. For example, if the detected energy on the channel is at or below the ED threshold level (e.g., indicating that the channel is relatively free of traffic), the initiator device may reserve the sidelink channel for a CoT and transmit the first PRS.

Different types of LBT procedures may be defined according to different categories. For example, Category 1 (Cat. 1) LBT specifies that LBT is not used. Cat. 2 LBT specifies the use of LBT without random back-off. Cat. 3 LBT specifies the use of LBT with random back-off with a fixed size contention window. Cat. 4 LBT specifies the use of LBT with random back-off with a variable sized contention window. In an aspect, the initiator device may implement Cat 4 LBT to reserve the CoT for all positioning group members. Thereafter, the responder devices may implement Cat 2 LBT to broadcast their PRSs.

In some examples, the wireless communication devices in a sidelink communication network may be categorized as either anchor devices or non-anchor devices. Anchor devices may include, for example, RSUs (e.g., RSUs 404, 406, and 408), along with V-UEs (e.g., V-UE 402) and P-UEs that include an accurate internal positioning device (e.g., GPS or other navigation system). Non-anchor devices may include, for example, V-UEs and P-UEs that do not include accurate internal positioning devices. Thus, anchor devices may be considered to have a known location based on a location accuracy (e.g., an allowed accuracy tolerance or deviation) and non-anchor devices may be considered to have an unknown location based on the location accuracy.

In some aspects, initiator devices may include anchor devices, whereas responder devices may include at least non-anchor devices. In some examples, an anchor device that receives a group formation message from another anchor initiator device may either become a responder device for that initiator device or become an initiator device for another positioning group. For example, the anchor device may compare a reference signal received power (RSRP) of the group formation message received from another anchor initiator device to determine whether to become a responder device for the other initiator device. As an example, if the RSRP of the received group formation message is greater than or equal to a threshold (threshold power), the anchor device may become a responder device. Otherwise, if the RSRP of the received group formation message is less than the threshold, the anchor device may become an initiator device for another positioning group. In this example, the other anchor initiator device may be excluded from the positioning group (e.g., the other anchor initiator device may form its own, separate positioning group).

Similarly, for responder devices, if multiple group formation messages are received from multiple anchor initiator devices, a responder device may select one of the anchor initiator devices and join the positioning group of the selected anchor initiator device (e.g., by transmitting a responder group formation message including the selected anchor initiator device ID). In some examples, each positioning group can be configured with a maximum number of members. If the maximum number of members has been reached for one of the positioning groups, the responder device may select the other positioning group or may become an initiator if no other positioning group is available. In some examples, a non-anchor device may not receive a group formation message from any anchor initiator devices. In this example, the non-anchor device may become an initiator device to initiate a positioning group for the non-anchor device.

In some examples, positioning group formation may be performed periodically. For example, group formation messages to form new positioning groups may be broadcast at a periodicity less than (e.g., with a longer duration than) the periodicity of a PRS cycle to enable the positioning groups to complete multiple PRS cycles before changing positioning groups. In some examples, a PRS cycle may be 100 ms. In this example, positioning group formation may be performed every 1000 ms.

For example, positioning group formation may be performed in a group phase in a time domain. The group phase may be followed by a PRS phase including one or more PRS cycles. The group phase may further include an initiator sub-phase and a responder sub-phase. Anchor devices may transmit initiator group formation messages within the initiator sub-phase. Responder devices may transmit responder group formation messages within the responder sub-phase. In addition, a non-anchor device that did not receive an initiator group formation message within the initiator sub-phase may transmit an initiator group formation message within the responder sub-phase. The group phase may further include a second initiator sub-phase after the responder sub-phase within which an initiator device may transmit a group association message identifying the members of the positioning group and the order thereof.

Figure 5:
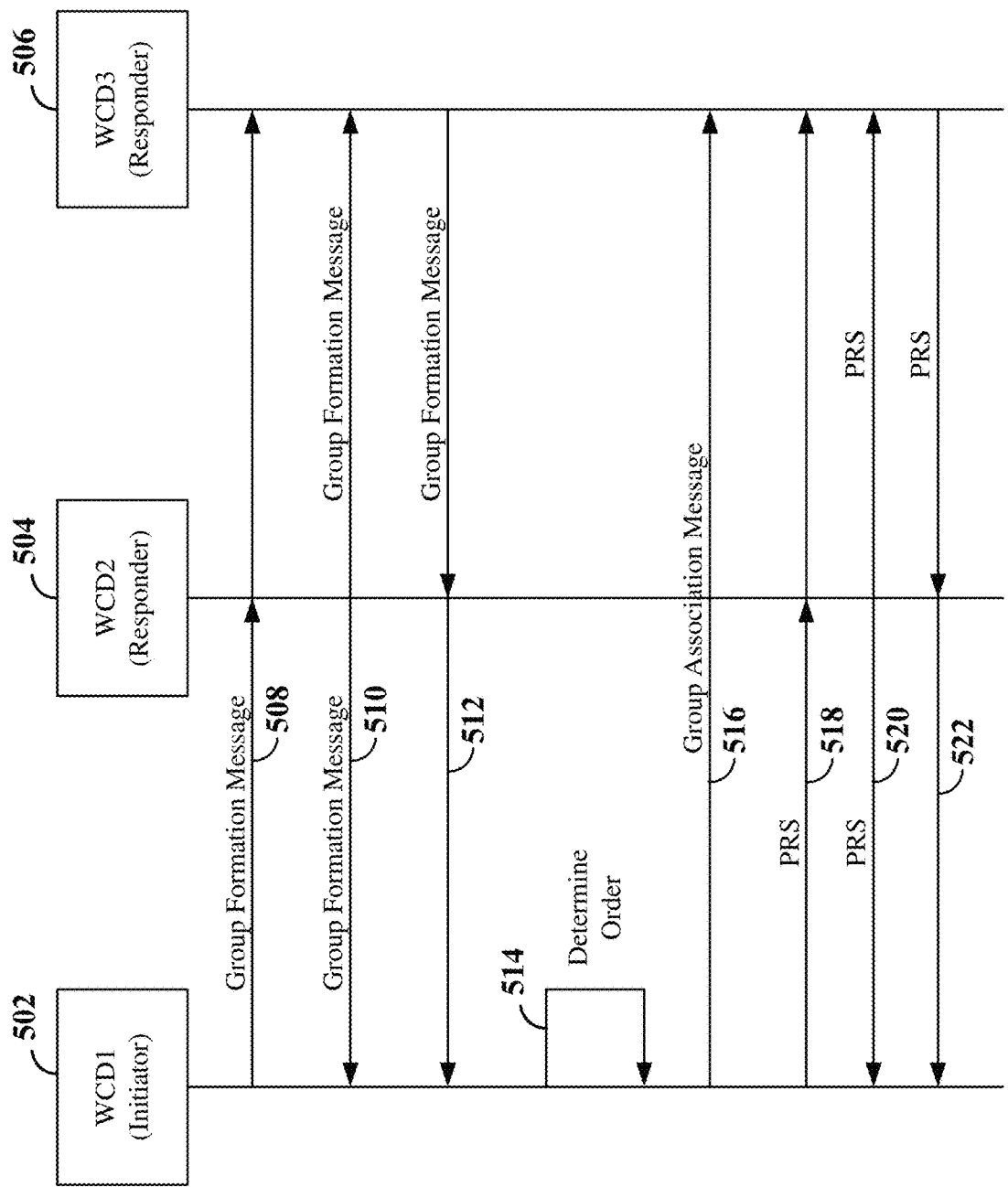
FIG. 5 is a signaling diagram illustrating an example of positioning group formation for group-based PRS broadcast according to some aspects.

FIG. 5 is a signaling diagram illustrating an example of positioning group formation for group-based PRS broadcast according to some aspects. In the example shown in FIG. 5, an initiator wireless communication device (WCD1) 502 is in wireless communication with responder wireless communication devices 504 and 506 (WCD2 and WCD3, respectively) over a sidelink channel. In some examples, the sidelink channel may include unlicensed spectrum (e.g., the ITS spectrum). In other examples, the sidelink channel may include licensed spectrum. The sidelink channel may utilize LBT or another channel sensing mechanism for channel access.

Each of the wireless communication devices 502, 504, and 506 may correspond to any of the RSUs, V-UEs, or P-UEs shown in FIGS. 2, 3, and/or 4. In some examples, the initiator wireless communication device 502 (referred to herein as an initiator device, for simplicity) may be an anchor device. In other examples, the initiator device 502 may be a non-anchor device in examples in which a group formation message is not received from an anchor device. The responder wireless communication devices 504 and 506 (referred to herein as responder devices, for simplicity) may be non-anchor devices or anchor devices (e.g., if the initiator device 502 is in close proximity to the anchor devices).

At 508, the initiator device 502 may broadcast a first group formation message over the sidelink channel to form a positioning group. At 510, the responder device 504 may broadcast a second group formation message over the sidelink channel to join the positioning group. The second group formation message may include, for example, an initiator ID of the initiator device. At 512, the responder device 506 may broadcast a third group formation message over the sidelink channel to join the positioning group. The third group formation may include, for example, the initiator ID of the initiator device and a responder ID of the responder device 504. Each of the first, second, and third group formation messages may further include other device information associated with the transmitting device. Examples of device information may include, but are not limited to, initiator information indicating whether the transmitting device is the initiator device of the positioning group, anchor information indicating whether the transmitting device is an anchor device or a non-anchor device, power information indicating whether the transmitting device is power limited (e.g., operating in a discontinuous reception mode), and a group ID identifying the transmitting device within the positioning group. In some examples, the group ID may be a random number within the group. In other examples, the group ID may be the UE ID (e.g., MAC ID) of the transmitting device.

At 514, the initiator device 502 may determine an order of the wireless communication devices 502, 504, and 506 within the positioning group. For example, upon receiving each of the second and third group formation messages, the initiator device 502 may include the responder devices 504 and 506 within the positioning group. The initiator device 502 may then be listed first in the order of wireless communication devices, followed by the other responder devices 504 and 506. Various factors may be used by the initiator device 502 to determine the order of the responder devices 504 and 506. For example, the order of responder devices 504 and 506 may be determined based on the device information contained within the group formation messages. In an example, the order may correspond to a descending order of responder devices.

At 516, the initiator device 502 may broadcast or groupcast a group association message to the responder devices 504 and 506. The group association message may include the initiator ID of the initiator device and the respective responder IDs of each of the responder devices 504 and 506 listed in the order of wireless communication devices (e.g., descending order).

At 518, 520, and 522, the initiator device 502 and responder devices 504 and 506 may each broadcast a respective PRS based on the order of wireless communication devices listed in the group association message. For example, the initiator device 502 may broadcast a first PRS at 518. Then, at 520, the responder device 504 may broadcast a second PRS. Then, at 522, the responder device 506 may broadcast a third PRS. In some examples, the initiator device 502 may implement Cat 4 LBT to transmit the first PRS and reserve the sidelink channel for a CoT within which all of the PRSs (and corresponding PRS measurement messages) may be transmitted. Thereafter, the responder devices 504 and 506 may implement Cat 2 LBT to broadcast their PRSs.

Figure 6:
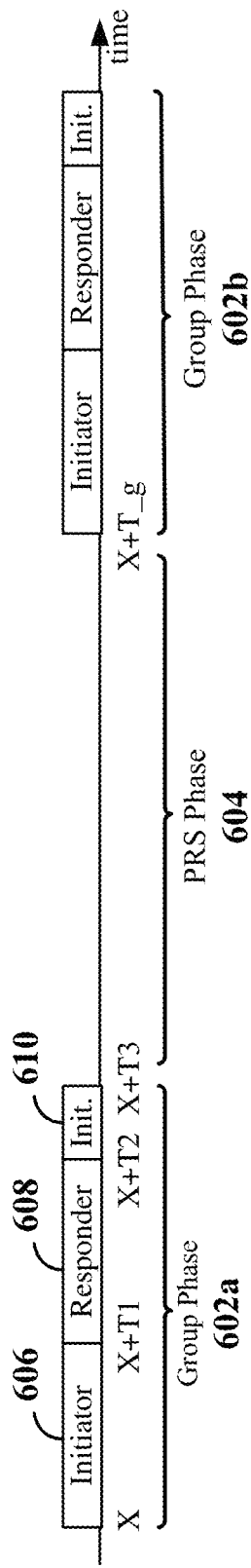
FIG. 6 is a diagram illustrating an example of time domain allocation for positioning group formation and group-based PRS broadcast according to some aspects.

FIG. 6 is a diagram illustrating an example of time domain allocation for positioning group formation and group-based PRS broadcast according to some aspects. In the example shown in FIG. 6, the sidelink channel may be time-divided into group phases (two of which 602a and 602b are illustrated, for simplicity) and PRS phases (one of which 604 is illustrated, for simplicity). The PRS phase 604 includes one or more PRS cycles. Each PRS cycle includes group-based PRSs broadcast by one or more positioning groups. For example, within a PRS cycle, the wireless communication devices within each positioning group may broadcast their PRSs (and corresponding PRS measurement messages) within respective CoTs reserved by the respective initiator devices. In some examples, the periodicity of the group phases 602a and 602b is less than the periodicity of the PRS cycles. For example, a PRS cycle may be 100 ms, and the periodicity of the group phases 602a and 602b may be 1000 ms. Thus, ten PRS cycles may occur between group phases 602a and 602b.

Each group phase 602a and 602b may be further time-divided into a first initiator sub-phase 606, a responder sub-phase 608, and a second initiator sub-phase 610. Within the first initiator sub-phase 606, anchor devices may transmit initiator group formation messages to initiate positioning groups. Within the responder sub-phase 608, responder devices (e.g., non-anchor devices and anchor devices within a close proximity to another anchor device that broadcast an initiator group formation message in the initiator sub-phase 606) may broadcast responder group formation messages. Within the second initiator sub-phase 610, initiator devices may broadcast or groupcast group association messages identifying the members of their respective positioning group and the respective PRS broadcast order of the members in their respective positioning group.

In the example shown in FIG. 6, an anchor device may broadcast its initiator group formation message at a time Unif(X+0, X+T1), where T1 is the time budget for the anchor devices to broadcast their group formation messages. In some examples, T1=100 ms. Here, X refers to the periodicity of the group phases 602a and 602b (e.g., X=0 ms, 1,000 ms, 2000 ms, 3000 ms, . . . ). In some examples, each subsequent group phase (e.g., group phase 602b) may begin after a time gap (X+T_g) from the end of the PRS phase 604 to minimize interference on the sidelink channel. Similarly, a responder device may broadcast its responder group formation message at a time Unif(X+T1, X+T2), where T2 is the time budget for the responder devices to broadcast their group formation messages. In some examples, T2≥100 ms. Then, each initiator device may broadcast its group association message at a time Unif(X+T2, X+T3), where T3 is the time budget for the initiator devices to broadcast their group association messages. In some examples, T3≤100 ms.

Figure 7:
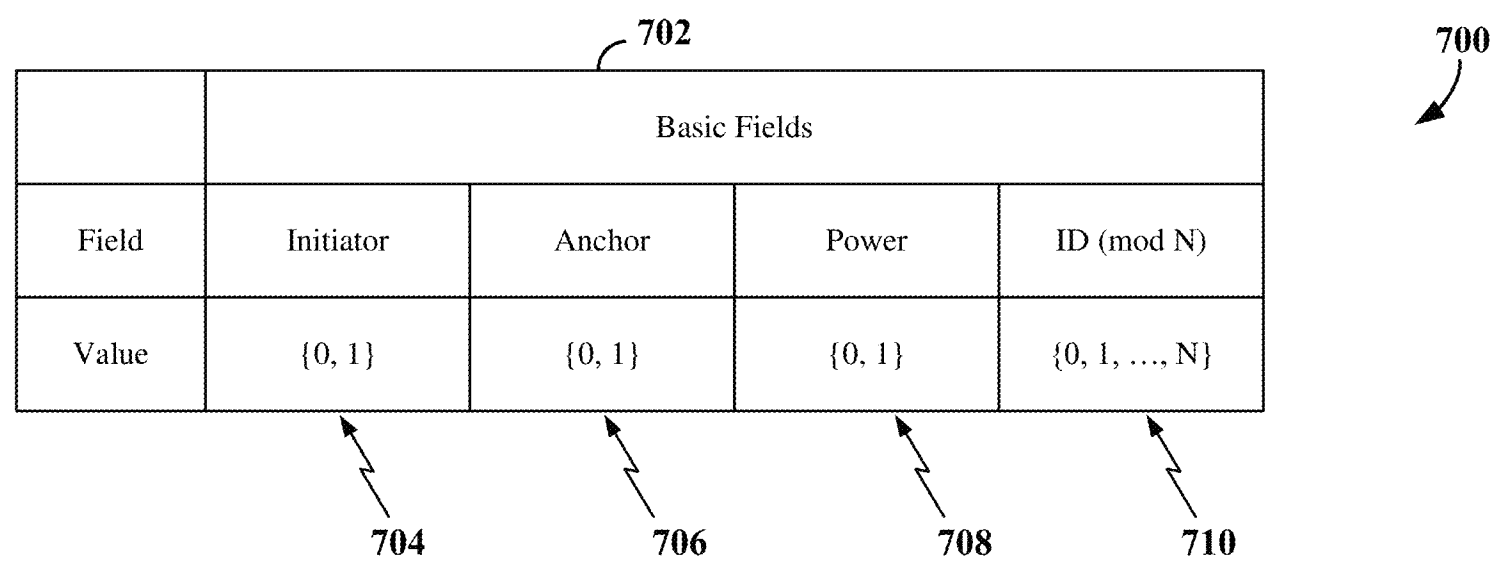

FIG. 7 is a diagram illustrating an example of a group formation message 700 that may be transmitted by a group initiator according to some aspects. The group formation message 700 payload includes a plurality of basic fields 702 carrying device information. The group formation message may further include a header (not shown) that may include, for example, the UE ID (e.g., MAC ID) of the transmitting device (e.g., an initiator device). The basic fields 702 may include, for example, an initiator field 704 carrying initiator information, an anchor field 706 carrying anchor information, a power field 708 carrying power information, and a group ID field 710 carrying a group ID for the transmitting device. The initiator information in field 704 indicates whether the transmitting device is the initiator device of the positioning group. For example, the initiator information in field 704 may include a single bit I={0, 1}, where I=1 indicates that the transmitting device is an initiator device and I=0 indicates that the transmitting device is a responder device. The anchor information in field 706 indicates whether the transmitting device is an anchor device or a non-anchor device. For example, the anchor information in field 706 may include a single bit A={0, 1}, where A=1 indicates that the transmitting device is an anchor device and A=0 indicates that the transmitting device is a non-anchor device.

The power information in field 708 indicates whether the transmitting device is power limited (e.g., operating in a DRX mode). For example, the power information 708 may include a single bit P={0, 1}, where P=1 indicates that the transmitting device is power limited. For P=1 devices, the PRS cycle periodicity may be less than a regular PRS cycle periodicity to accommodate the DRX mode of the transmitting device. Therefore, transmitting devices having P=1 may not transmit a PRS within each PRS cycle during the PRS phase. The group ID in field 710 identifies the transmitting device within the positioning group. In some examples, the group ID may be a random number within the group. For example, as shown in FIG. 7, the group ID may be a single bit ID={0, 1, . . . , N}, selected from mod(N). In other examples, the group ID may be the UE ID (e.g., MAC ID) of the transmitting device.

FIG. 8 is a diagram illustrating an example of a group formation message 800 that may be transmitted by a group responder according to some aspects. In the example shown in FIG. 8, the group formation message 800 payload includes basic fields 802 and responder fields 804. The group formation message 800 may further include a header (not shown) that includes, for example, the UE ID (e.g., MAC ID) of the transmitting responder device. The basic fields 802 include the same fields as shown in FIG. 7 and carry the device information of the transmitting device (e.g., responder device transmitting the group formation message 800). For example, the basic fields 802 include an initiator field 806 carrying initiator information, an anchor field 808 carrying anchor information, a power field 810 carrying power information, and a group ID field 812 carrying a group ID for the transmitting device, as discussed above in connection with FIG. 7.

The responder fields 804 may include an initiator ID field 814 carrying an initiator ID of the initiator device for the positioning group and a responder ID field 816 carrying a list of responder IDs. Each of the responder IDs included in the responder ID field 816 is associated with a responder device that previously transmitted a responder group formation message 800 in the responder sub-phase including the initiator ID of the initiator device of the positioning group and responder IDs of other responder devices that previously transmitted other responder group formation messages 800. In some examples, the initiator ID and responder IDs may be UE IDs for each of the initiator and responder devices. In other examples, the initiator ID and responder IDs may each be based on the respective group IDs of the initiator and responder devices. For example, the initiator ID may include a concatenation of the initiator group ID and initiator UE ID. In addition, the responder IDs may each include a concatenation of the respective responder group ID and the respective responder UE ID. As another example, the initiator ID and responder IDs may include the initiator group ID and responder group IDs, respectively.

FIG. 9 is a diagram illustrating an example of a group association message 900 that may be transmitted by the group initiator according to some aspects. In the example shown in FIG. 9, the group association message 900 payload includes basic fields 902 and a responder ID field 904. The group association message 900 may further include a header (not shown) that may include, for example, the UE ID (e.g., MAC ID) of the initiator device. The basic fields 902 include the same fields as shown in FIG. 7 and carry the device information of the transmitting device (e.g., initiator device transmitting the group association message 900). For example, the basic fields 902 include an initiator field 906 carrying initiator information, an anchor field 908 carrying anchor information, a power field 910 carrying power information, and a group ID field 912 carrying a group ID for the transmitting device, as discussed above in connection with FIG. 7.

The responder ID field 904 includes a list of responder IDs 914 identifying the members (e.g., responder devices) of the positioning group and the order of the responder devices in the positioning group. In some examples, the responder IDs 914 may be UE IDs or respective group IDs for each of the responder devices. In other examples, the responder IDs 914 may each include a concatenation of the respective responder group ID and the respective responder UE ID of each responder device in the positioning group.

The order of responder IDs 914 included in the responder ID field 904 corresponds to the order of responder devices in the positioning group (e.g., the order with which responder devices may transmit their respective PRSs). In some examples, the responder IDs 914 are listed in descending order, where the top (first) responder ID identifies the first responder device to transmit a PRS after the initiator device, the second responder ID identifies the second responder device to transmit a PRS after the first responder device, and so on.

In some examples, the order of responder IDs 914 may be determined based on the device information included in the basic fields of the responder group formation message transmitted by each of the responder devices. For example, referring now to FIG. 8, the initiator field 806 may include the most significant bit (MSB) and the group ID field 812 may include the least significant bit (LSB). In this example, referring again to FIG. 9, the order of responder IDs 914 in the responder ID field 904 may result in anchor devices being listed before non-anchor devices, and power limited devices (e.g., which may generally be non-anchor devices) being listed after non-power limited devices. By placing power limited responder devices towards the bottom of the list of responder IDs, a reduced latency between PRSs may be achieved even when a power limited device may not be awake during a particular PRS cycle.

Figure 10:
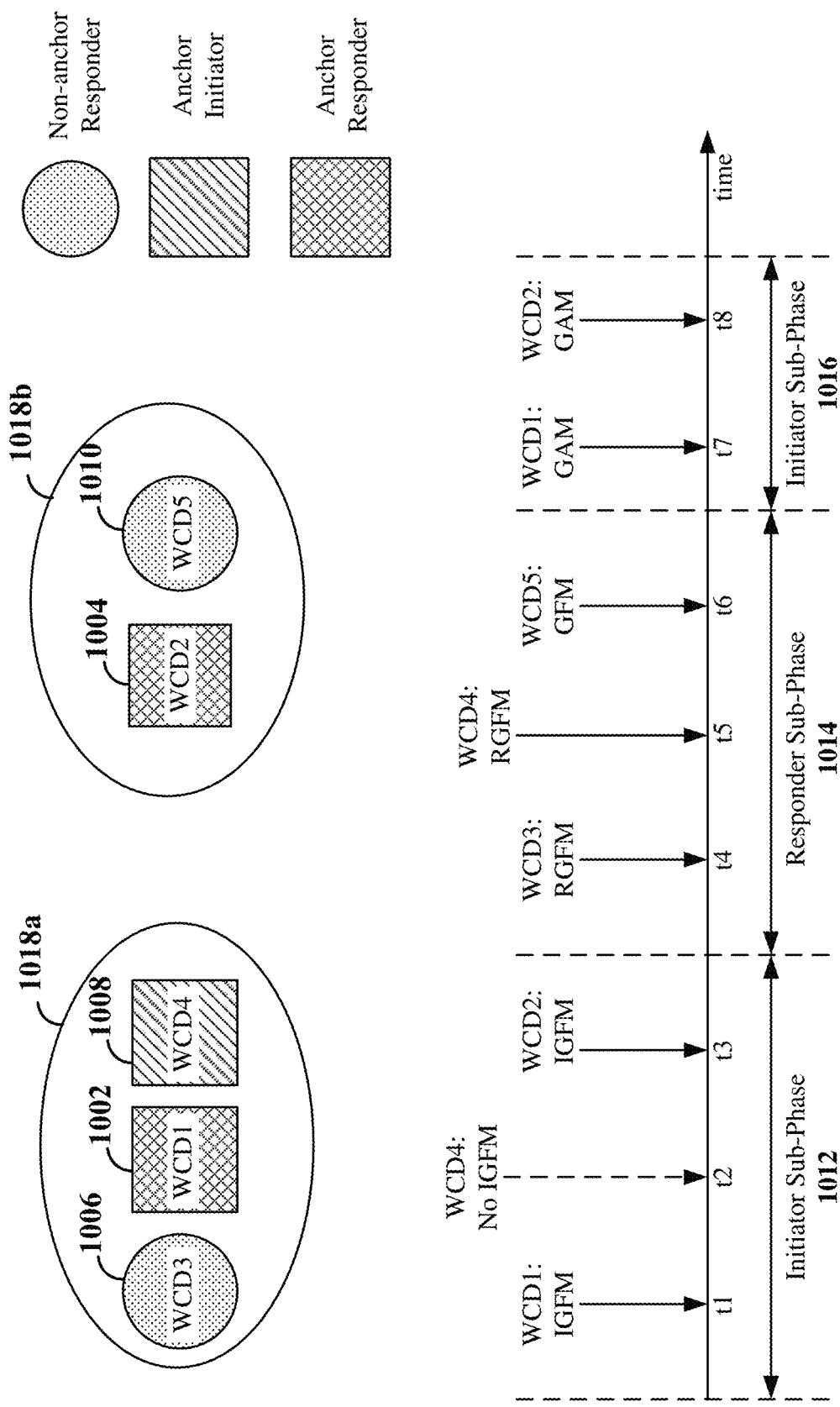
FIG. 10 is a diagram illustrating an example of positioning group formation according to some aspects.

FIG. 10 is a diagram illustrating an example of positioning group formation by a plurality of wireless communication devices (WCD1 1002, WCD2 1004, WCD3 1006, WCD4 1008, and WCD5 1010) communicating over a sidelink channel, according to some aspects. Each wireless communication device 1002, 1004, 1006, 1008, and 1010 may correspond to a sidelink device (e.g., a V2X device), such as an RSU, V-UE, P-UE, or other sidelink device. In the example shown in FIG. 10, WCD1 1002, WCD2 1004, and WCD4 1008 are anchor devices, while WCD3 1006 and WCD5 1010 are non-anchor devices.

During a first initiator sub-phase 1012 of a group phase in the time domain, one or more of the anchor devices WCD1 1002, WCD2 1004, and WCD4 1008 can broadcast initiator group formation messages (IGFMs) on the sidelink channel. For example, at a first time (t1), WCD1 1002 may broadcast a first initiator group formation message on the sidelink channel to form a positioning group 1018a including WCD1 1002. The first initiator group formation message may be received by each of the other wireless communication devices 1004, 1006, 1008, and 1010. Each receiving wireless communication device 1004, 1006, 1008, and 1010 may then determine whether to join the WCD1 positioning group 1018a based on the first initiator group formation message.

For example, WCD4 1008 may receive the first initiator group formation message broadcast from WCD1 1002 and measure a received power (e.g., RSRP) at WCD4 1008 of the first initiator group formation message to determine whether to join the WCD1 positioning group 1018a. In some examples, the WCD4 1008 may compare the received power of the first initiator group formation message to a threshold (e.g., a threshold power) to determine whether to join the WCD1 positioning group 1018a. In an example, if the received power of the first initiator group formation message is less than the threshold, thus indicating that the WCD1 1002 is located distant from WCD4 1008, the WCD4 1008 may decide to not join the WCD1 positioning group 1018a. However, if the received power of the first initiator group message is greater than or equal to the threshold, thus indicating that the WCD1 1002 is proximate to WCD4 1008, as shown in the example of FIG. 10, the WCD4 1008 may decide to join the WCD1 positioning group 1018a. Therefore, at a second time (t2), the WCD4 1008 may not transmit an initiator group formation message.

As another example, WCD2 1004 may also receive the first initiator group formation message broadcast from WCD1 1002 and measure the received power at WCD2 1004 of the first initiator group formation message. If the received power, as measured at WCD2 1004, is greater than or equal to a threshold (e.g., which may be the same or different than the threshold used by WCD4 1008), the WCD2 1004 may decide to join the WCD1 positioning group 1018a. However, if the received power of the first initiator group message is less than the threshold, as shown in the example of FIG. 10, the WCD2 1004 may decide to not join the WCD1 positioning group 1018a. Therefore, at a third time (t3), the WCD2 1004 may broadcast a second initiator group formation message on the sidelink channel to form a second positioning group 1018b including the WCD2 1004.

During a responder sub-phase 1014 of the group phase, responder devices can broadcast respective responder group formation messages (RGFMs) to join one of the positioning groups 1018a and 1018b. Here, the responder devices include the anchor device WCD4 1008 and non-anchor devices WCD3 1006 and WCD5 1010. Each responder device WCD3 1006, WCD4 1008, and WCD5 1010 may receive each of the first initiator group formation message broadcast by WCD1 1002 and the second initiator group formation message broadcast by WCD2 1004 and determine whether to join the WCD1 positioning group 1018a or the WCD2 positioning group 1018b based on the received initiator group formation messages.

For example, WCD3 1006 may receive the first initiator group formation message broadcast by WCD1 1002 and the second initiator group formation message broadcast by WCD2 1004. The WCD3 1006 may further measure a received power (e.g., RSRP) of each of the first and second initiator group formation messages and compare the received power of each of the first and second initiator group formation messages to select one of the positioning groups 1018a or 1018b based on a higher received power, as measured at the WCD3 1006, of the first or second initiator group formation messages. In the example shown in FIG. 10, the received power of the first initiator group formation message broadcast by WCD1 1002, as measured by WCD3 1006, is higher than the received power of the second initiator group formation message broadcast by WCD2 1004. As such, at a fourth time (t4), WCD3 1006 may broadcast a first responder group formation message to join the WCD1 positioning group 1018a. The first responder group formation message may include the initiator ID of the initiator device WCD1 1002 and the device information (e.g., basic fields 802 shown in FIG. 8) of the WCD3 1006.

Anchor responder device WCD4 1008 opted to not transmit an initiator group formation message during the initiator sub-phase 1012 based on a high RSRP (e.g., greater than or equal to a threshold), as measured by the WCD4 1008, of the first initiator group formation message broadcast by WCD1 1002 at the first time (t1). Therefore, during the responder sub-phase 1014, at a fifth time (t5), WCD4 1008 may broadcast a second responder group formation message to join the WCD1 positioning group 1018a. The second responder group formation message may include the initiator ID of the initiator device WCD1 1002, the responder ID of WCD3 1006 that previously broadcast a responder group formation message to join the WCD1 positioning group 1018, and the device information (e.g., basic fields 802 shown in FIG. 8) of the WCD4 1008.

Non-anchor responder device WCD5 1010 may also receive the first initiator group formation message broadcast by WCD1 1002 and the second initiator group formation message broadcast by WCD2 1004. The WCD5 1010 may further measure a received power (e.g., RSRP) of each of the first and second initiator group formation messages and compare the received power of each of the first and second initiator group formation messages to select one of the positioning groups 1018a or 1018b based on a higher received power, as measured at the WCD5 1010, of the first or second initiator group formation messages.

In addition, WCD5 1010 may also receive each of the responder group formation messages previously broadcast by WCD3 1006 and WCD4 1008 in the responder sub-phase 1014 and determine the positioning group 1018a and 1018b selected by each of the responder devices WCD3 1006 and WCD4 1008. The WCD5 1010 may further determine the number of responder devices that have joined each of the positioning groups 1018*a* and 1018*b* based on the received responder group formation messages. In addition, the WCD5 1010 may determine whether either of the positioning groups 1018*a* and 1018*b* has reached a maximum number of members. For example, the maximum number of positioning group members may be pre-configured for all positioning groups or may be included in the initiator group formation message broadcast by the initiator device. If, for example, positioning group 1018*a* has reached the maximum number of members, the WCD5 1010 may select the other positioning group 1018*b*. In examples in which more than two positioning groups are available, the WCD5 1010 may select the positioning group with the highest initiator group formation message RSRP that has not yet reached the maximum number of members.

In the example shown in FIG. 10, at a sixth time (t6), WCD5 1010 may broadcast a third responder group formation message to join the WCD2 positioning group 1018*b* based on either a higher received power of the initiator group formation message broadcast by WCD2 1004 or a maximum number of members being reached for positioning group 1018*a*. The third responder group formation message may include the initiator ID of the initiator device WCD2 1004 and the device information (e.g., basic fields 802 shown in FIG. 8) of the WCD5 1010.

During a second initiator sub-phase 1016, the initiator devices (e.g., WCD1 1002 and WCD2 1004) for each of the positioning groups 1018*a* and 1018*b* can broadcast a respective group association message that identifies the members of each positioning group and specifies a respective order of the members in that positioning group. For example, at a seventh time (t7), WCD1 1002 may broadcast a first group association message including the initiator ID of WCD1 1002 and the responder IDs of WCD3 1006 and WCD4 1008 listed in an order for transmitting respective PRSs. In addition, at an eighth time (t8), WCD2 1004 may broadcast a second group association message including the initiator ID of WCD2 1004 and the responder ID of WCD5 1010.

Figure 11:
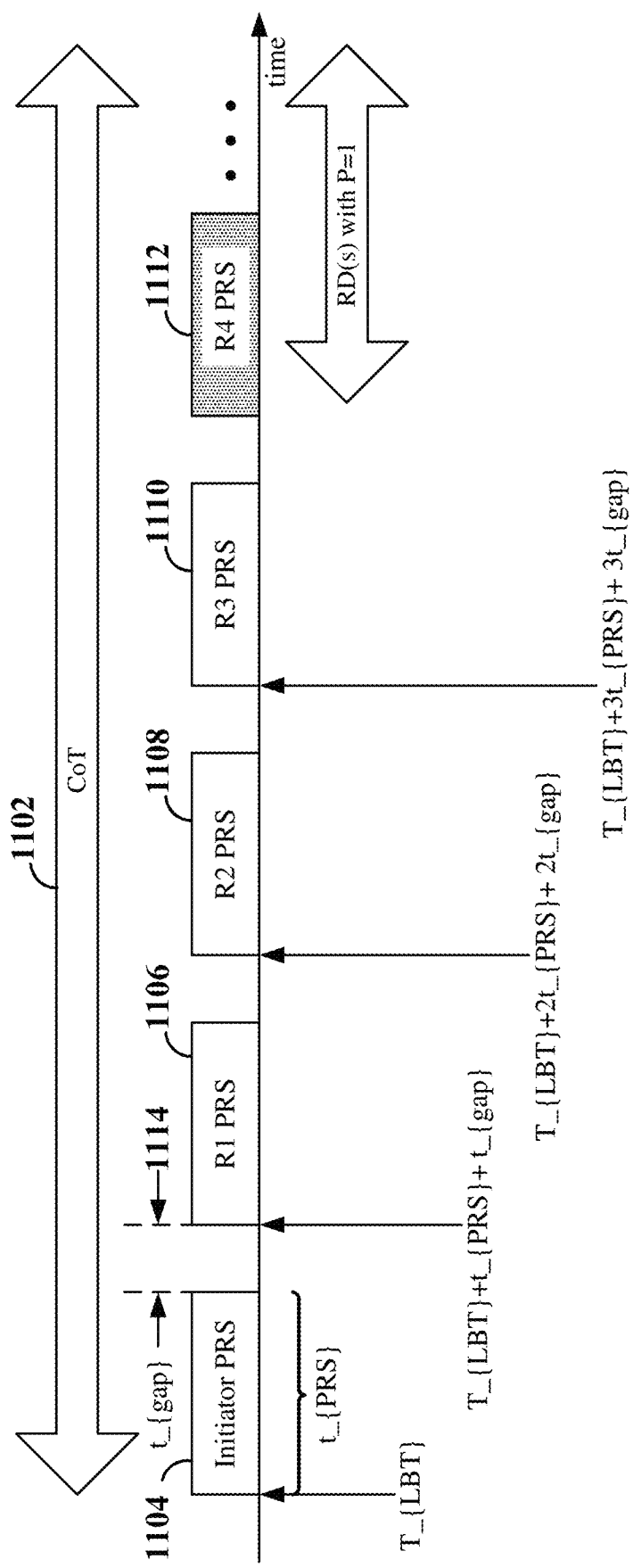
FIG. 11 is a diagram illustrating an example of group-based PRS broadcast according to some aspects.

FIG. 11 is a diagram illustrating an example of group-based PRS broadcast according to some aspects. The group-based PRS broadcast example shown in FIG. 11 may be performed, for example, during a PRS cycle within the PRS phase in the time domain. As shown in FIG. 11, an initiator device of the positioning group may reserve the sidelink channel for a CoT 1102 sufficient for the transmission of PRSs by each of the members of the positioning group. In some examples, the initiator device may implement Cat 4 LBT to reserve the CoT 1102 for all positioning group members and transmit a first PRS (e.g., an initiator PRS 1104) at a time $T\_\{LBT\}$. Thereafter, the responder devices in the positioning group may implement Cat 2 LBT to broadcast their PRSs 1106, 1108, 1110, and 1112. Each PRS 1104-1112 may include a respective PRS sequence. For example, each PRS sequence may be a wideband random sequence that is broadcast over an unlicensed frequency band. In some examples, each PRS may further include a sequence identifier (ID) identifying the PRS sequence.

Each responder device may determine the respective transmission timing of its PRS within the CoT 1102 from the group association message indicating the order of responder devices within the positioning group. For example, each PRS 1104-1112 may have a same (e.g., set) duration denoted as $t\_\{PRS\}$. In addition, each responder device may provide a respective gap 1114, denoted as $t\_\{gap\}$, between the end of the previously transmitted PRS and the responder device PRS. In some examples, the gap 1114 may be 25 μs. Upon determining that a first responder device (R1) is listed first in the order of responder devices within the group association message, the first responder device (R1) may transmit a second PRS (R1 PRS) 1106 at a time $T\_\{LBT\}+t\_\{PRS\}+t\_\{gap\}$. Similarly, a second responder device (R2) may transmit a third PRS (R2 PRS) at a time $T\_\{LBT\}+2t\_\{PRS\}+2t\_\{gap\}$. Furthermore, a third responder device (R3) may transmit a fourth PRS (R3 PRS) 1108 at a time $T\_\{LBT\}+3t\_\{PRS\}+3t\_\{gap\}$. In general, the k-th wireless communication device PRS broadcast time may be determined as: $T\_\{LBT\}+(k-1)t\_\{PRS\}+(k-1)t\_\{gap\}$. By providing a fixed gap 1114 between the PRSs and a known order of PRS transmissions, the latency between PRSs may be reduced, thus improving the efficiency and accuracy of sidelink positioning.

Other responder devices (e.g., responder device R4) may transmit their respective PRSs (e.g., R4 PRS 1112) at respective transmission times similarly determined based on the order listed in the group association message. In some examples, responder devices (RDs) that are power limited (e.g., P=1 in the device information shown in FIG. 8) may be placed at the end of the responder list (e.g., at the bottom of the order). Such power limited responder devices (e.g., responder device R4) may have a lower duty cycle than a non-power limited responder device (e.g. a responder device with P=0), and as such may not transmit a PRS each PRS cycle, as indicated by the shading of R4 PRS 1112. For example, a power limited responder device may transmit a PRS (and corresponding PRS measurement message) every 500 ms or 1000 ms, whereas a non-power limited responder device may transmit a PRS every 100 ms within the PRS phase. By placing the power limited responder devices at the end of the list, the latency between consecutive PRSs 1104-1112 may be reduced during each PRS cycle.

Figure 12:
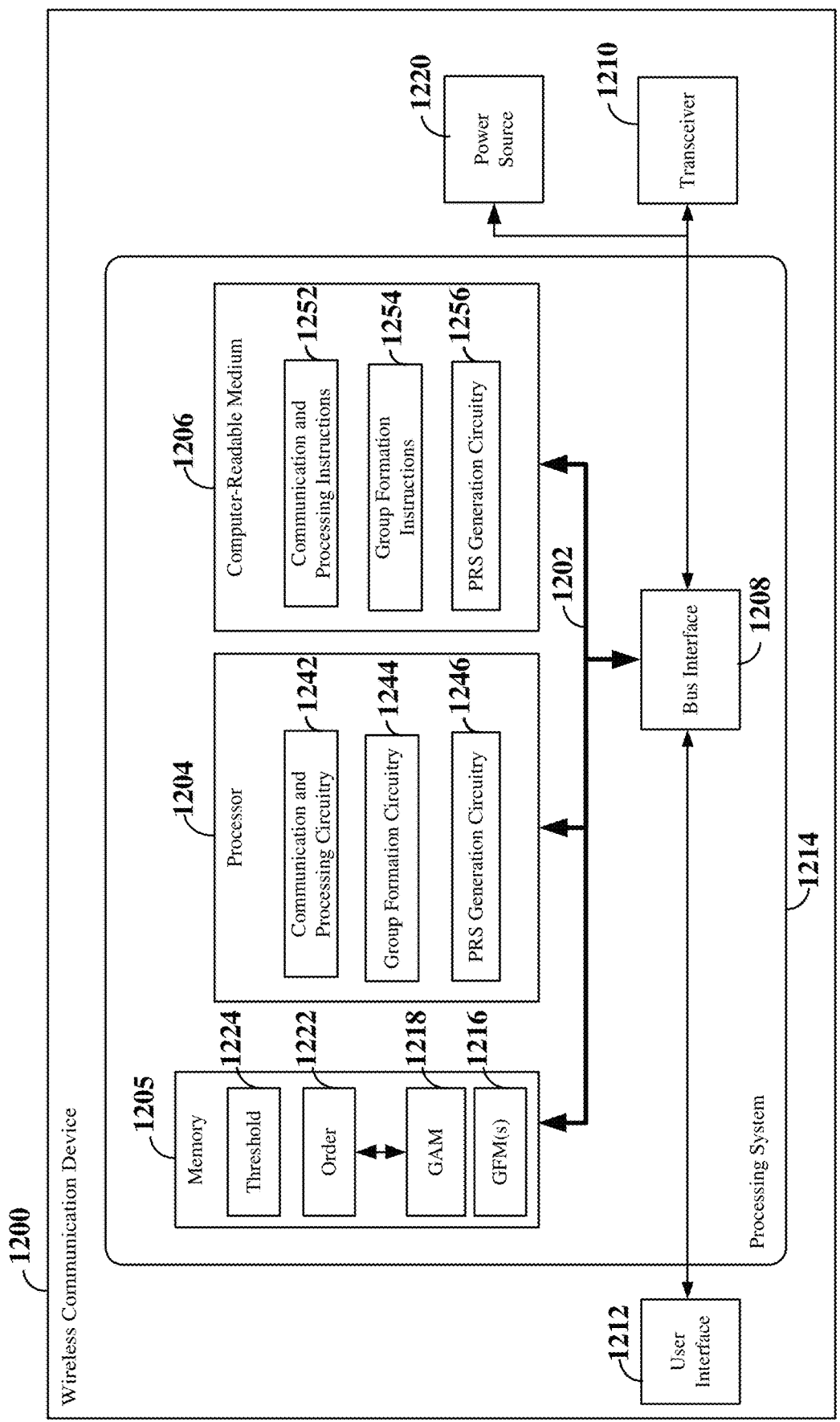
FIG. 12 is a block diagram illustrating an example of a hardware implementation for a wireless communication device employing a processing system according to some aspects.

FIG. 12 is a block diagram illustrating an example of a hardware implementation for a wireless communication device 1200 employing a processing system 1214. For example, the wireless communication device 1200 may correspond to a sidelink (e.g., V2X) device, such as an RSU, V-UE, P-UE, or other suitable sidelink device, as shown and described above in reference to FIGS. 1-5 or 10.

The wireless communication device 1200 may be implemented with a processing system 1214 that includes one or more processors 1204. Examples of processors 1204 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the wireless communication device 1200 may be configured to perform any one or more of the functions described herein. That is, the processor 1204, as utilized in the wireless communication device 1200, may be used to implement any one or more of the processes and procedures described below.

In this example, the processing system 1214 may be implemented with a bus architecture, represented generally by the bus 1202. The bus 1202 may include any number of interconnecting buses and bridges depending on the specific application of the processing system 1214 and the overall design constraints. The bus 1202 links together various circuits including one or more processors (represented generally by the processor 1204), a memory 1205, and computer-readable media (represented generally by the computer-readable medium 1206). The bus 1202 may also link various other circuits such as timing sources, peripherals, voltage regulators, and power management circuits, which are well known in the art, and therefore, will not be described any further.

A bus interface 1208 provides an interface between the bus 1202 and a transceiver 1210. The transceiver 1210 provides a means for communicating with various other apparatus over a transmission medium (e.g., air interface). The bus interface 1208 further provides an interface between the bus 1202 and a power source (e.g., a battery) 1220. Depending upon the nature of the apparatus, a user interface 1212 (e.g., keypad, display, touch screen, speaker, microphone, control knobs, etc.) may also be provided. Of course, such a user interface 1212 is optional, and may be omitted in some examples.

The processor 1204 is responsible for managing the bus 1202 and general processing, including the execution of software stored on the computer-readable medium 1206. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software, when executed by the processor 1204, causes the processing system 1214 to perform the various functions described below for any particular apparatus. The computer-readable medium 1206 and the memory 1205 may also be used for storing data that is manipulated by the processor 1204 when executing software.

The computer-readable medium 1206 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1206 may reside in the processing system 1214, external to the processing system 1214, or distributed across multiple entities including the processing system 1214. The computer-readable medium 1206 may be embodied in a computer program product. By way of example, a computer program product may include a computer-readable medium in packaging materials. In some examples, the computer-readable medium 1206 may be part of the memory 1205. Those skilled in the art will recognize how best to implement the described functionality presented throughout this disclosure depending on the particular application and the overall design constraints imposed on the overall system.

In some aspects of the disclosure, the processor 1204 may include circuitry configured for various functions. For example, the processor 1204 may include communication and processing circuitry 1242, configured to communicate with other wireless communication devices (e.g., RSUs, V-UEs, P-UEs, etc.) over a sidelink channel. In some examples, the communication and processing circuitry 1242 may include one or more hardware components that provide the physical structure that performs processes related to wireless communication (e.g., signal reception and/or signal transmission) and signal processing (e.g., processing a received signal and/or processing a signal for transmission).

In some examples, the communication and processing circuitry 1242 may be configured to broadcast a group formation message over the sidelink channel via the transceiver 1210. The communication and processing circuitry 1242 may further be configured to receive one or more group formation messages broadcast by other wireless communication devices via the transceiver 1210. The communication and processing circuitry 1242 may further be configured to store the received group formation messages (GFMs) 1216 in memory 1205 for further processing.

The communication and processing circuitry 1242 may further be configured to broadcast or receive, via the transceiver 1210, a group association message (GAM) 1218 indicating an order 1222 of a plurality of wireless communication devices within a positioning group including the wireless communication device 1200. The communication and processing circuitry 1242 may further be configured to broadcast a positioning reference signal (PRS) within the positioning group and to receive PRSs broadcast from other wireless communication devices within the positioning group. The communication and processing circuitry 1242 may further be configured to execute communication and processing instructions (software) 1252 stored in the computer-readable medium 1206 to implement one or more of the functions described herein.

The processor 1204 may further include group formation circuitry 1244, configured to generate a group formation message (e.g., an initiator group formation message or a responder group formation message) to be broadcast on the sidelink channel and to process group formation messages (e.g., initiator group formation messages and/or responder group formation messages) received from other wireless communication devices. In examples in which the wireless communication device 1200 is an anchor device, the group formation circuitry 1244 may be configured to determine whether an initiator group formation message has been received from another anchor initiator wireless communication device during an initiator sub-phase of a current group phase within which positioning groups may be formed.

If an initiator group formation message has been received, the group formation circuitry 1244 may measure the received power (e.g., RSRP) of the initiator group formation message and compare the received power to a threshold 1224, which may be stored, for example, in memory 1205. If the received power of the initiator group formation message is greater than the threshold 1224, the initiator group formation message 1216 may be stored in memory 1205 and utilized by the group formation circuitry 1244 to generate a responder group formation message during a responder sub-phase of the current group phase to join the positioning group initiated by the initiator group formation message. Here, the anchor device 1200 is functioning as a responder device. Otherwise, if the received power of the initiator group formation message is less than or equal to the threshold 1224, the group formation circuitry 1244 may discard the received initiator group formation message and generate a new initiator group formation message to form a new positioning group for the wireless communication device 1200. Here, the anchor device is functioning as an initiator device. If another initiator group formation message has not been received within the initiator sub-phase, the anchor device 1200 may function as an initiator device and the group formation circuitry 1244 may generate an initiator group formation message to form a positioning group for the wireless communication device 1200.

In examples in which the wireless communication device 1200 is an initiator device that broadcasts an initiator group formation message during the current initiator sub-phase to form a positioning group, the group formation circuitry 1244 may further be configured to receive one or more responder group formation messages 1216 from responder devices within the responder sub-phase of the current group phase. Each responder group formation message 1216 may include, for example, device information associated with the respective responder device, an initiator ID of the initiator device 1200 and respective responder IDs of other responder devices that previously broadcast responder group formation messages to join the positioning group of the initiator device 1200. The received responder group formation messages 1216 may be stored, for example, in memory 1205 for further processing. For example, the group formation circuitry 1244 may further be configured to utilize the received responder group formation messages 1216 to determine an order 1222 of the responder devices to transmit respective PRSs within a PRS phase subsequent in time to the current group phase. The order 1222 may be based on, for example, the device information associated with each responder device. In some examples, the order 1222 may include a list of responder devices in descending order, such that the first listed responder device should broadcast a PRS after the initiator device, the second listed responder device should broadcast a PRS after the first listed responder device, and so on. The group formation circuitry 1244 may further be configured to generate a group association message (GAM) 1218 for the positioning group. The GAM 1218 may include, for example, an initiator ID of the initiator device 1200 and the order 1222 of the responder devices. The GAM 1218 may be broadcast within a second initiator sub-phase of the current group phase.

In examples in which the wireless communication device 1200 is a non-anchor device, the non-anchor device 1200 may determine whether an initiator group formation message has been received from an initiator device during the initiator sub-phase of the current group phase. If an initiator group formation message has not yet been received, the group formation circuitry 1244 may function as an initiator device to generate an initiator group formation message and broadcast the initiator group formation message during the responder sub-phase of the current group phase to form a positioning group for the non-anchor device 1200.

If one or more initiator group formation messages 1216 have been received, the non-anchor device 1200 may function as a responder device to select a positioning group to join based on the received initiator group formation messages 1216. The received initiator group formation messages may be stored, for example, in memory 1205 until a positioning group is selected for the non-anchor device. For example, the group formation circuitry 1244 may measure the received power (e.g., RSRP) of each initiator group formation message 1216 and select the positioning group associated with the initiator group formation message 1216 having the highest received power.

As another example, the group formation circuitry 1244 may determine a number of members of each of the positioning groups associated with the received initiator group formation messages 1216. The number of members of a particular positioning group may be determined, for example, based on responder group formation messages 1216 received for that particular positioning group during the responder sub-phase of the current group phase. For example, the group formation circuitry 1244 may be configured to count the number of responder group formation messages 1216 received for each positioning group. If the number of members of a positioning group has reached a maximum number of members, the group formation circuitry 1244 may not select that positioning group. Instead, the group formation circuitry 1244 may select another positioning group for which the number of members has not reached the maximum number of members. Here, the maximum number of members for a positioning group may be pre-determined and stored, for example, in memory 1205 or included in the initiator group formation message. In some examples, the group formation circuitry 1244 may further select a positioning group from the remaining positioning groups that have a number of members less than the maximum number of members based on the received power of the corresponding initiator group formation messages 1216.

Upon selecting a positioning group to join, the group formation circuitry 1244 may then generate a responder group formation message to be broadcast during the responder sub-phase of the current group phase. The responder group formation message may include, for example, device information associated with the non-anchor device 1200, the initiator ID of the initiator device for the selected positioning group, and respective responder IDs of responder devices that previously broadcast responder group formation messages 1216 to join the positioning group prior to generation of the responder group formation message by the group formation circuitry 1244. In addition, the group formation circuitry 1244 may receive the GAM 1218 including the order 1222 of responder devices from the initiator device of the positioning group. The group formation circuitry 1244 may further be configured to execute group formation instructions (software) 1254 stored in the computer-readable medium 1206 to implement one or more of the functions described herein.

The processor 1204 may further include PRS generation circuitry 1246 configured to generate a PRS to be broadcast to the positioning group during a PRS phase. For example, the PRS may include a PRS sequence. The PRS sequence may be a wideband random sequence that is broadcast over an unlicensed frequency band. In some examples, the PRS may include a sequence identifier (ID) identifying the PRS sequence. The PRS generation circuitry 1246 may further determine the transmission timing of the PRS based on the order 1222 of wireless communication devices in the positioning group. In examples in which the wireless communication device is the initiator device of the positioning group, the PRS generation circuitry 1246 may be configured to implement Cat 4 LBT to reserve the sidelink channel for a CoT and broadcast the first PRS to the positioning group within the CoT. In examples in which the wireless communication device is a responder device, the PRS generation circuitry 1246 may be configured to broadcast the PRS to the positioning group within the CoT at a transmission time determined from the order 1222 of responder devices. The PRS generation circuitry 1246 may further be configured to execute PRS generation instructions (software) 1256 stored in the computer-readable medium 1206 to implement one or more of the functions described herein.

Figure 13:
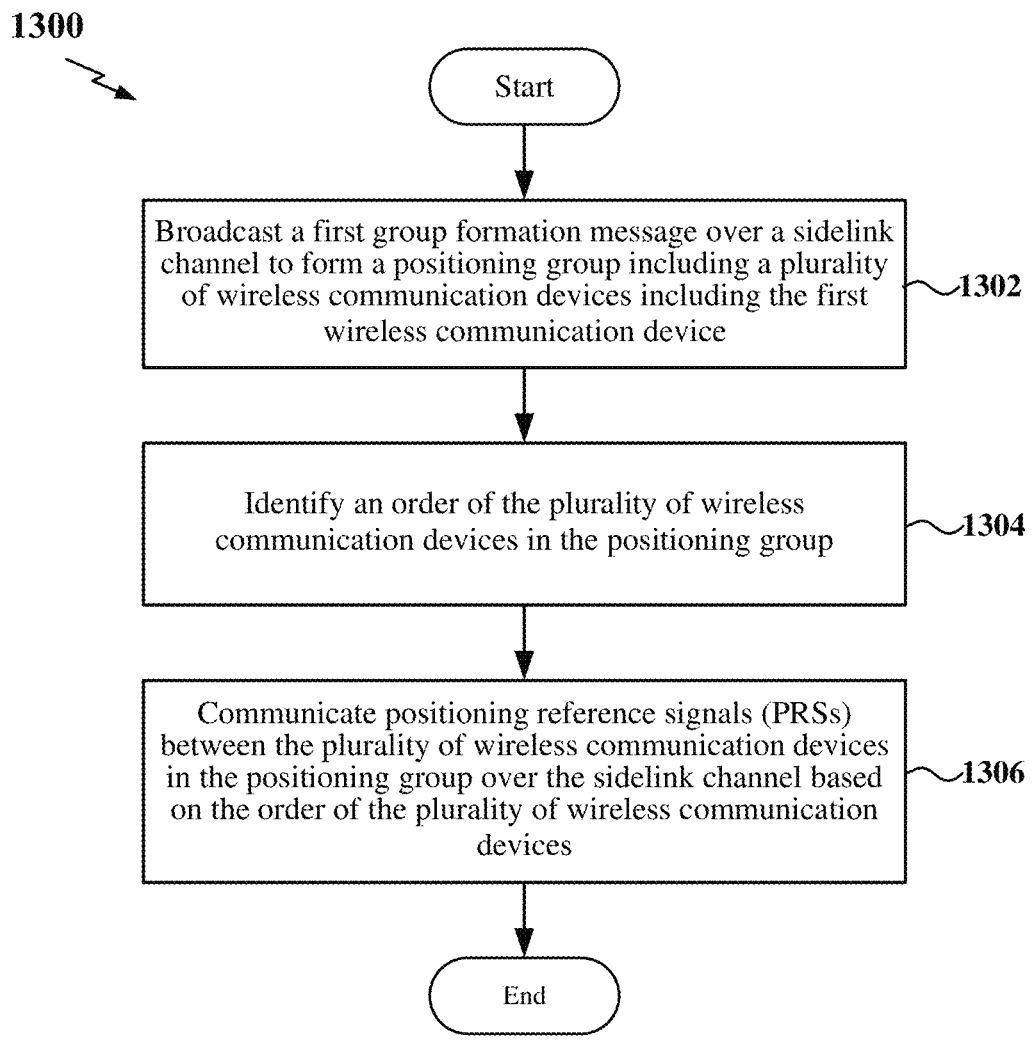
FIG. 13 is a flow chart of an exemplary method for group-based PRS broadcast according to some aspects.

FIG. 13 is a flow chart of an exemplary method 1300 for group-based PRS broadcast according to some aspects. As described below, some or all illustrated features may be omitted in a particular implementation within the scope of the present disclosure, and some illustrated features may not be required for implementation of all examples. In some examples, the method may be performed by the wireless communication device 1200, as described above and illustrated in FIG. 12, by a processor or processing system, or by any suitable means for carrying out the described functions.

At block 1302, the wireless communication device (e.g., a first wireless communication device) may broadcast a first group formation message over a sidelink channel to form a positioning group including a plurality of wireless communication devices including the first wireless communication device. In some examples, the first wireless communication device may broadcast the first group formation message within a group phase in a time domain. The group phase may include at least an initiator sub-phase within which initiator devices can broadcast respective group formation messages and a responder sub-phase within which responder devices can broadcast respective group formation messages. The initiator devices may include at least anchor devices, each having a respective known location based on a location accuracy. The responder devices include at least non-anchor devices, each having a respective unknown location based on the location accuracy.

In some examples, the first wireless communication device may broadcast the first group formation message within the initiator sub-phase when the first wireless communication device is one of the anchor devices to identify the first wireless communication device as an initiator device for the positioning group. In some examples, the first wireless communication device may receive a second group formation message within the initiator sub-phase from a second wireless communication device, compare a received power of the second group formation message with a threshold, and broadcast the first group formation message within the initiator sub-phase when the received power is less than the threshold. In this example, the first wireless communication device may exclude the second wireless communication device from the positioning group.

In some examples, the first wireless communication device may receive a third group formation message from a third wireless communication device within the responder sub-phase. The third wireless communication device may be one of the responder devices. The first wireless communication device may further include the third wireless communication device in the positioning group. In some examples, the third wireless communication device may be one of the non-anchor devices or another one of the anchor devices.

In some examples, each of a plurality of group formation messages, including the first and third group formation messages, includes initiator information indicating whether a transmitting device of a respective group formation message of the plurality of group formation messages is the initiator device of the positioning group, anchor information indicating whether the transmitting device is one of the anchor devices, power information indicating whether the transmitting device is power limited, and a group identity (ID) identifying the transmitting device within the positioning group. In some examples, the group ID includes a random number. In some examples, the third group formation message further includes an initiator ID of the initiator device of the positioning group, and respective responder IDs of each of the responder devices that broadcast the respective group formation messages within the responder sub-phase prior to the third group formation message. In some examples, the initiator ID is based on the group ID of the initiator device and each of the responder IDs are based on the respective group IDs of each of the responder devices.

In some examples, the first wireless communication device may broadcast the first group formation message within the responder sub-phase when the first wireless communication device is a responder device of the responder devices for the positioning group. In some examples, the first wireless communication device is one of the non-anchor devices or one of the anchor devices. In some examples, the first wireless communication device may further receive a fourth group formation message within the initiator sub-phase from a first initiator device of the initiator devices associated with a first positioning group, and receive a fifth group formation message within the initiator sub-phase from a second initiator device of the initiator devices associated with a second positioning group. In an example, the first wireless communication device may compare a first received power of the fourth group formation message to a second received power of the fifth group formation message, and select one of the first positioning group or the second positioning group within which to broadcast the first group formation message based on a higher received power at the first wireless communication device between the first received power and the second received power. In another example, the first wireless communication device may determine that a respective number of members of one of the first positioning group or the second positioning group has reached a respective maximum number of members, and select the other of the first positioning group or the second positioning group for which the respective number of members is less than the respective maximum number of members.

In some examples, the first wireless communication device may determine that no group formation messages were received within the initiator sub-phase, and broadcast the first group formation message within the responder sub-phase when the first wireless communication device is one of the non-anchor devices to identify the first wireless communication device as an initiator device for the positioning group. For example, the group formation circuitry 1244, together with the communication and processing circuitry 1242 and transceiver 1210, shown and described above in connection with FIG. 12, may provide a means to broadcast the first group formation message over the sidelink channel.

At block 1304, the first wireless communication device may identify an order of the plurality of wireless communication devices in the positioning group. In some examples, the first wireless communication device may broadcast a group association message identifying the plurality of wireless communication devices within the group and the order of the plurality of wireless communication devices in the positioning group beginning with the initiator device. In some examples, each of the plurality of group formation messages includes a basic field value produced as a composite of the initiator information, the anchor information, the power information, and the group ID, and the order of the plurality of wireless communication devices is listed in the group association message in decreasing order of the respective basic field values associated with each of the plurality of wireless communication devices. In some examples, the group association message includes the respective responder IDs of each of the plurality of wireless communication devices in the positioning group. For example, the group formation circuitry 1244 shown and described above in connection with FIG. 12 may provide a means to identify the order.

At block 1306, the first wireless communication device may communicate positioning reference signals (PRSs) between the plurality of wireless communication devices in the positioning group over the sidelink channel based on the order of the plurality of wireless communication devices. In some examples, the first wireless communication device may reserve the sidelink channel for a channel occupancy time (CoT) for transmission of the PRSs within a PRS phase subsequent in time to the group phase. In some examples, the first wireless communication device may determine respective transmission timing of each of the PRSs within the CoT from the order of the plurality of wireless communication devices. For example, the PRS generation circuitry 1246, together with the communication and processing circuitry 1242 and transceiver 1210, shown and described above in connection with FIG. 12 may provide a means to communicate PRSs based on the order.

Figure 14:
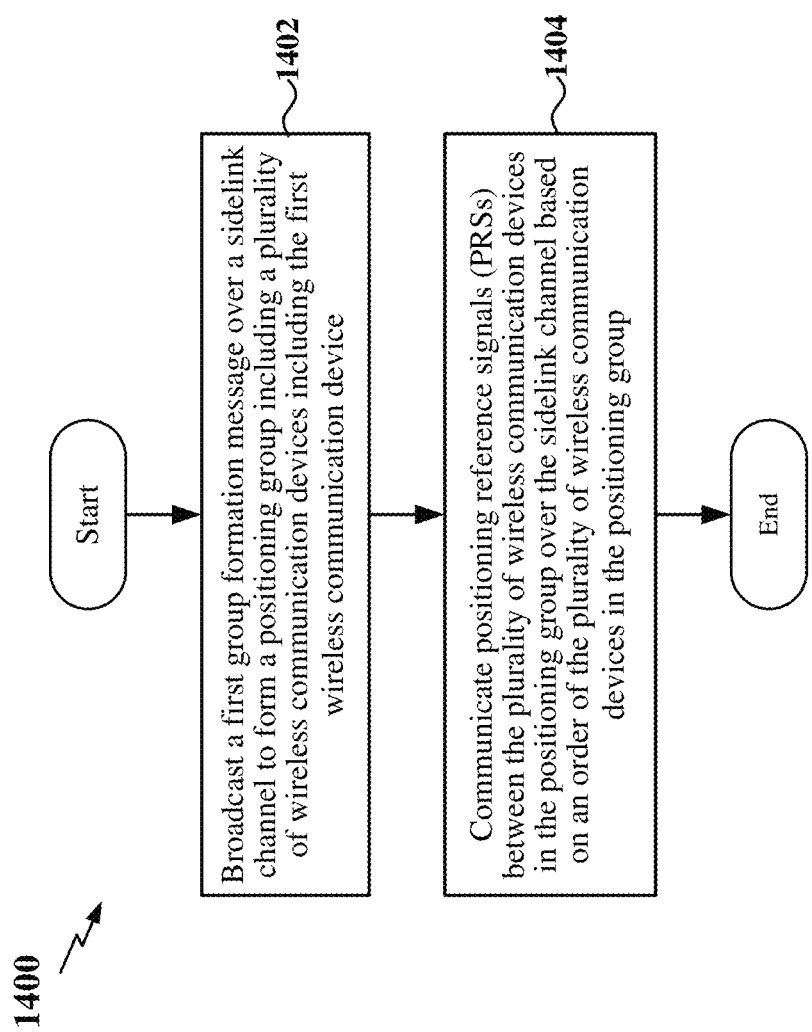
FIG. 14 is a flow chart of another exemplary method for group-based PRS broadcast according to some aspects.

FIG. 14 is a flow chart of another exemplary method 1400 for group-based PRS broadcast according to some aspects. As described below, some or all illustrated features may be omitted in a particular implementation within the scope of the present disclosure, and some illustrated features may not be required for implementation of all examples. In some examples, the method may be performed by the wireless communication device 1200, as described above and illustrated in FIG. 12, by a processor or processing system, or by any suitable means for carrying out the described functions.

At block 1402, the wireless communication device (e.g., a first wireless communication device) may broadcast a first group formation message over a sidelink channel to form a positioning group including a plurality of wireless communication devices including the first wireless communication device. In some examples, the first wireless communication device may broadcast the first group formation message during a group phase in a time domain. The group phase may include at least an initiator sub-phase within which initiator devices can broadcast respective group formation messages and a responder sub-phase within which responder devices can broadcast respective other group formation messages. The initiator devices may include at least anchor devices, each having a respective known location based on a location accuracy. The responder devices include at least non-anchor devices, each having a respective unknown location based on the location accuracy.

In some examples, the first wireless communication device may broadcast the first group formation message during the initiator sub-phase when the first wireless communication device is one of the anchor devices to identify the first wireless communication device as an initiator device for the positioning group. In some examples, the first wireless communication device may receive a second group formation message during the initiator sub-phase from a second wireless communication device, compare a received power of the second group formation message with a threshold, and broadcast the first group formation message during the initiator sub-phase when the received power is less than the threshold. In this example, the first wireless communication device may exclude the second wireless communication device from the positioning group.

In some examples, the first wireless communication device may receive a third group formation message from a third wireless communication device within the responder sub-phase. The third wireless communication device may be one of the responder devices. The first wireless communication device may further include the third wireless communication device in the positioning group. In some examples, the third wireless communication device may be one of the non-anchor devices or another one of the anchor devices.

In some examples, each of a plurality of group formation messages, including the first and third group formation messages, includes initiator information indicating whether a transmitting device of a respective group formation message of the plurality of group formation messages is the initiator device of the positioning group, anchor information indicating whether the transmitting device is one of the anchor devices, power information indicating whether the transmitting device is power limited, and a group identity (ID) identifying the transmitting device within the positioning group. In some examples, the group ID includes a random number. In some examples, the third group formation message further includes an initiator ID of the initiator device of the positioning group, and respective responder IDs of each of the responder devices that broadcast the respective group formation messages within the responder sub-phase prior to the third group formation message. In some examples, the initiator ID is based on the group ID of the initiator device and each of the responder IDs are based on the respective group IDs of each of the responder devices.

In some examples, the first wireless communication device may broadcast the first group formation message within the responder sub-phase when the first wireless communication device is a responder device of the responder devices for the positioning group. In some examples, the first wireless communication device is one of the non-anchor devices or one of the anchor devices. In some examples, the first wireless communication device may further receive a fourth group formation message during the initiator sub-phase from a first initiator device of the initiator devices associated with a first positioning group, and receive a fifth group formation message during the initiator sub-phase from a second initiator device of the initiator devices associated with a second positioning group. In an example, the first wireless communication device may compare a first received power of the fourth group formation message to a second received power of the fifth group formation message, and select one of the first positioning group or the second positioning group within which to broadcast the first group formation message based on a higher received power at the first wireless communication device between the first received power and the second received power. In another example, the first wireless communication device may determine that a respective number of members of one of the first positioning group or the second positioning group has reached a respective maximum number of members, and select the other of the first positioning group or the second positioning group for which the respective number of members is less than the respective maximum number of members.

In some examples, the first wireless communication device may determine that no group formation messages were received during the initiator sub-phase, and broadcast the first group formation message within the responder sub-phase when the first wireless communication device is one of the non-anchor devices to identify the first wireless communication device as an initiator device for the positioning group. For example, the group formation circuitry 1244, together with the communication and processing circuitry 1242 and transceiver 1210, shown and described above in connection with FIG. 12, may provide a means to broadcast the first group formation message over the sidelink channel.

At block 1404, the first wireless communication device may communicate positioning reference signals (PRSs) between the plurality of wireless communication devices in the positioning group over the sidelink channel based on an order of the plurality of wireless communication devices in the positioning group. In some examples, the first wireless communication device may reserve the sidelink channel for a channel occupancy time (CoT) for transmission of the PRSs within a PRS phase subsequent in time to the group phase. In some examples, the first wireless communication device may determine respective transmission timing of each of the PRSs within the CoT from the order of the plurality of wireless communication devices.

In some examples, the first wireless communication device may broadcast a group association message identifying the plurality of wireless communication devices within the group and the order of the plurality of wireless communication devices in the positioning group beginning with the initiator device. In some examples, each of the plurality of group formation messages includes a basic field value produced as a composite of the initiator information, the anchor information, the power information, and the group ID, and the order of the plurality of wireless communication devices is listed in the group association message in decreasing order of the respective basic field values associated with each of the plurality of wireless communication devices. In some examples, the group association message includes the respective responder IDs of each of the plurality of wireless communication devices in the positioning group. For example, the PRS generation circuitry 1246, together with the communication and processing circuitry 1242 and transceiver 1210, shown and described above in connection with FIG. 12 may provide a means to communicate PRSs based on the order.

Figure 15:
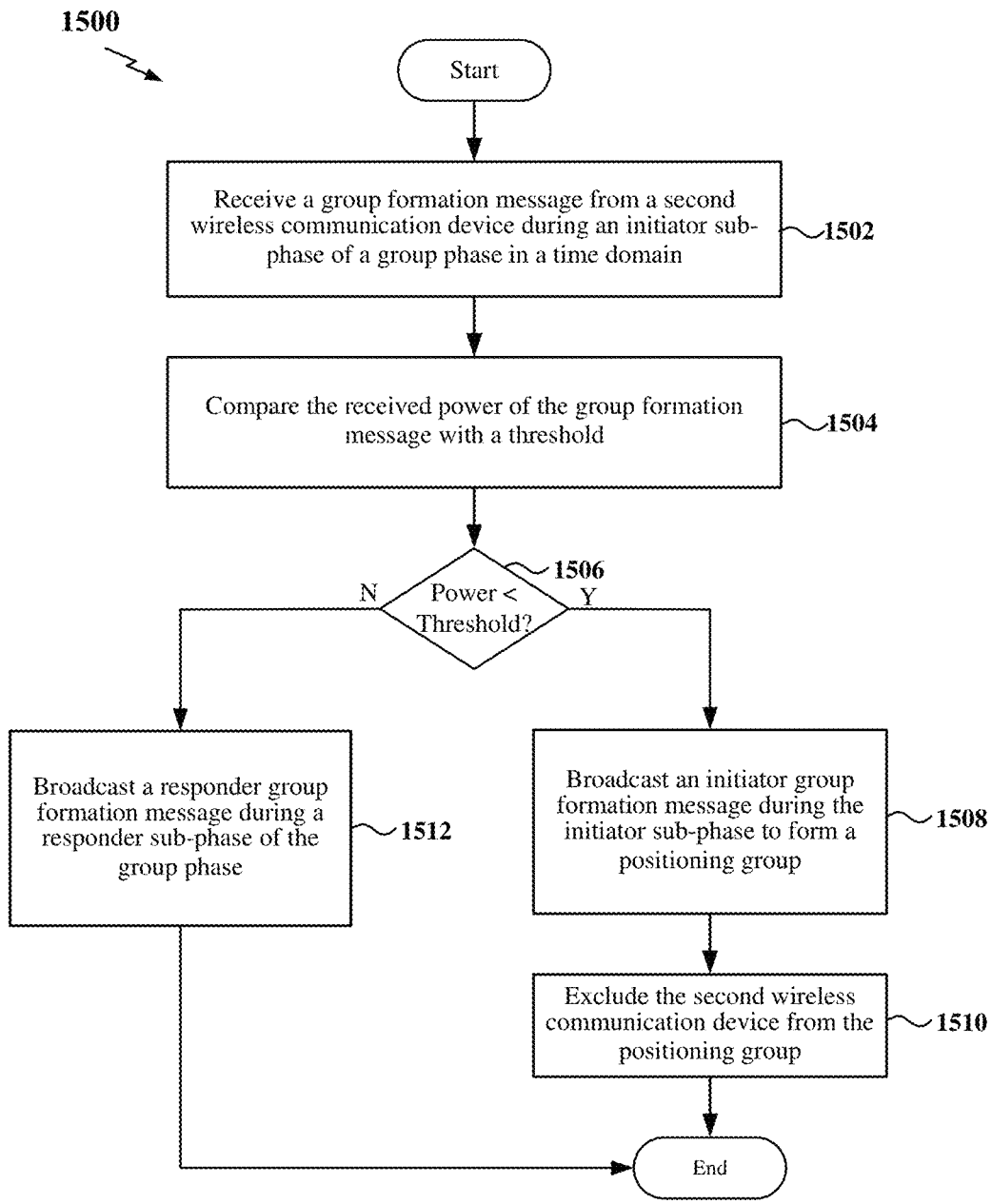
FIG. 15 is a flow chart of another exemplary method for group-based PRS broadcast according to some aspects.

FIG. 15 is a flow chart of another exemplary method 1500 for group-based PRS broadcast according to some aspects. As described below, some or all illustrated features may be omitted in a particular implementation within the scope of the present disclosure, and some illustrated features may not be required for implementation of all examples. In some examples, the method may be performed by the wireless communication device 1200, as described above and illustrated in FIG. 12, by a processor or processing system, or by any suitable means for carrying out the described functions.

At block 1502, the wireless communication device (e.g., a first wireless communication device) may receive a group formation message from a second wireless communication device during an initiator sub-phase of a group phase in a time domain. The initiator sub-phase may be a duration of time within which initiator devices can broadcast respective initiator group formation messages. The initiator devices may include at least anchor devices, each having a respective known location based on a location accuracy. The group phase may further include a responder sub-phase within which responder devices can broadcast respective responder group formation messages. The responder devices include at least non-anchor devices, each having a respective unknown location based on the location accuracy. For example, the group formation circuitry 1244, together with the communication and processing circuitry 1242 and transceiver 1210, shown and described above in connection with FIG. 12, may provide a means to receive the group formation message.

At block 1504, the first wireless communication device may compare the received power of the group formation message with a threshold. For example, the group formation circuitry 1244 shown and described above in connection with FIG. 12 may provide a means to compare the received power of the group formation message with a threshold.

In examples in which the received power of the group formation message is less than the threshold (Y branch of block 1506), at block 1508, the first wireless communication device may broadcast an initiator group formation message during the initiator sub-phase to form a positioning group including a plurality of wireless communication devices including the first wireless communication device. For example, the group formation circuitry 1244, together with the communication and processing circuitry 1242 and transceiver 1210, shown and described above in connection with FIG. 12, may provide a means to broadcast the first group formation message. In addition, at block 1510, the first wireless communication device may exclude the second wireless communication device from the positioning group. For example, the group formation circuitry 1244 shown and described above in connection with FIG. 12 may provide a means to exclude the second wireless communication device from the positioning group.

In examples in which the received power of the group formation message is greater than the threshold (N branch of block 1506), at block 1512, the first wireless communication device may broadcast a responder group formation message during the responder sub-phase of the group phase. In this example, the first wireless communication device is a responder device of the responder devices for the positioning group. In some examples, the first wireless communication device is one of the non-anchor devices or one of the anchor devices. For example, the group formation circuitry 1244, together with the communication and processing circuitry 1242 and transceiver 1210, shown and described above in connection with FIG. 12, may provide a means to broadcast the responder group formation message during the responder sub-phase.

Figure 16:
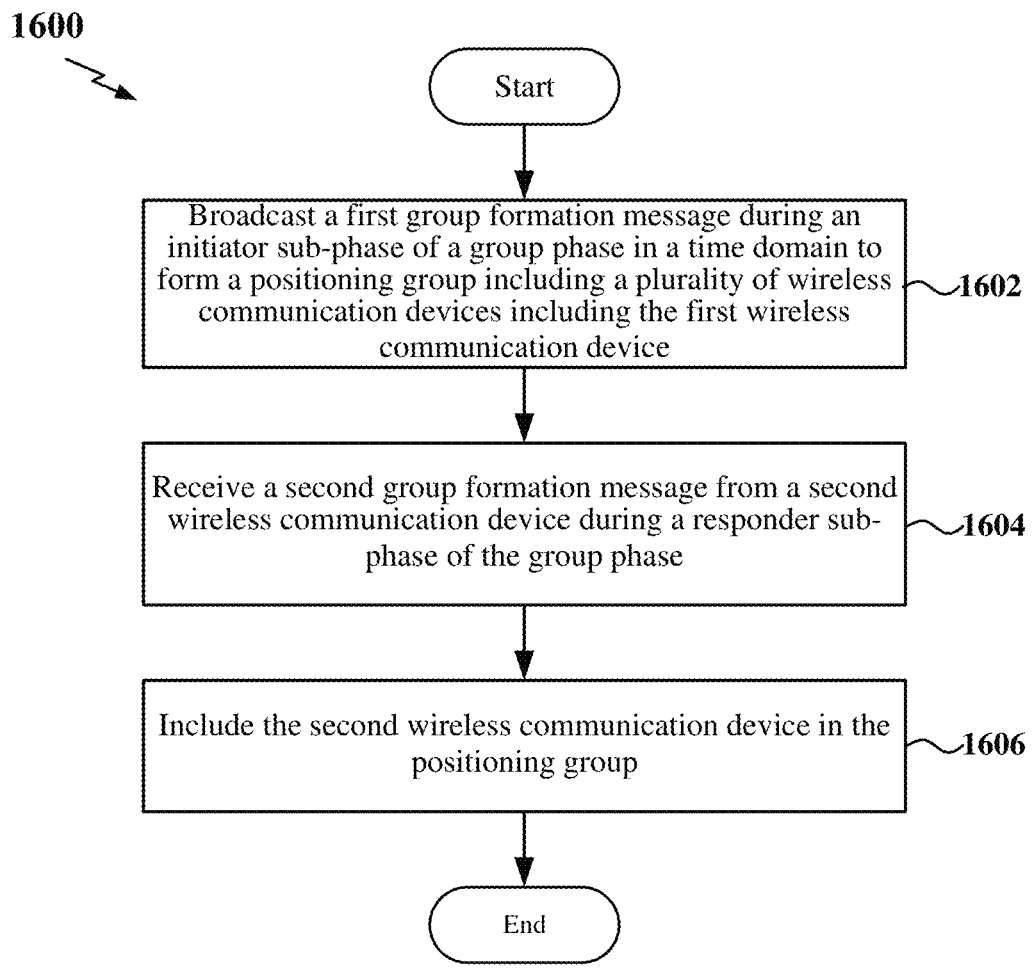
FIG. 16 is a flow chart of another exemplary method for group-based PRS broadcast according to some aspects.

FIG. 16 is a flow chart of another exemplary method 1600 for group-based PRS broadcast according to some aspects. As described below, some or all illustrated features may be omitted in a particular implementation within the scope of the present disclosure, and some illustrated features may not be required for implementation of all examples. In some examples, the method may be performed by the wireless communication device 1200, as described above and illustrated in FIG. 12, by a processor or processing system, or by any suitable means for carrying out the described functions.

At block 1602, the wireless communication device (e.g., a first wireless communication device) may broadcast a first group formation message during an initiator sub-phase of a group phase in a time domain to form a positioning group including a plurality of wireless communication devices including the first wireless communication device. The initiator sub-phase may be a duration of time within which initiator devices can broadcast respective group formation messages. The initiator devices may include at least anchor devices, each having a respective known location based on a location accuracy. The group phase may further include a responder sub-phase within which responder devices can broadcast respective other group formation messages. The responder devices include at least non-anchor devices, each having a respective unknown location based on the location accuracy. For example, the group formation circuitry 1244, together with the communication and processing circuitry 1242 and transceiver 1210, shown and described above in connection with FIG. 12, may provide a means to broadcast the first group formation message.

At block 1604, the first wireless communication device may receive a second group formation message from a second wireless communication device during the responder sub-phase of the group phase. The second wireless communication device may be one of the responder devices. For example, the second wireless communication device may be one of the non-anchor devices or another one of the anchor devices. For example, the group formation circuitry 1244, together with the communication and processing circuitry

1242 and transceiver 1210, shown and described above in connection with FIG. 12, may provide a means to receive the second group formation message.

At block 1606, the first wireless communication device may include the second wireless communication device in the positioning group. For example, the group formation circuitry 1244 shown and described above in connection with FIG. 12 may provide a means to include the second wireless communication device in the positioning group.

Figure 17:
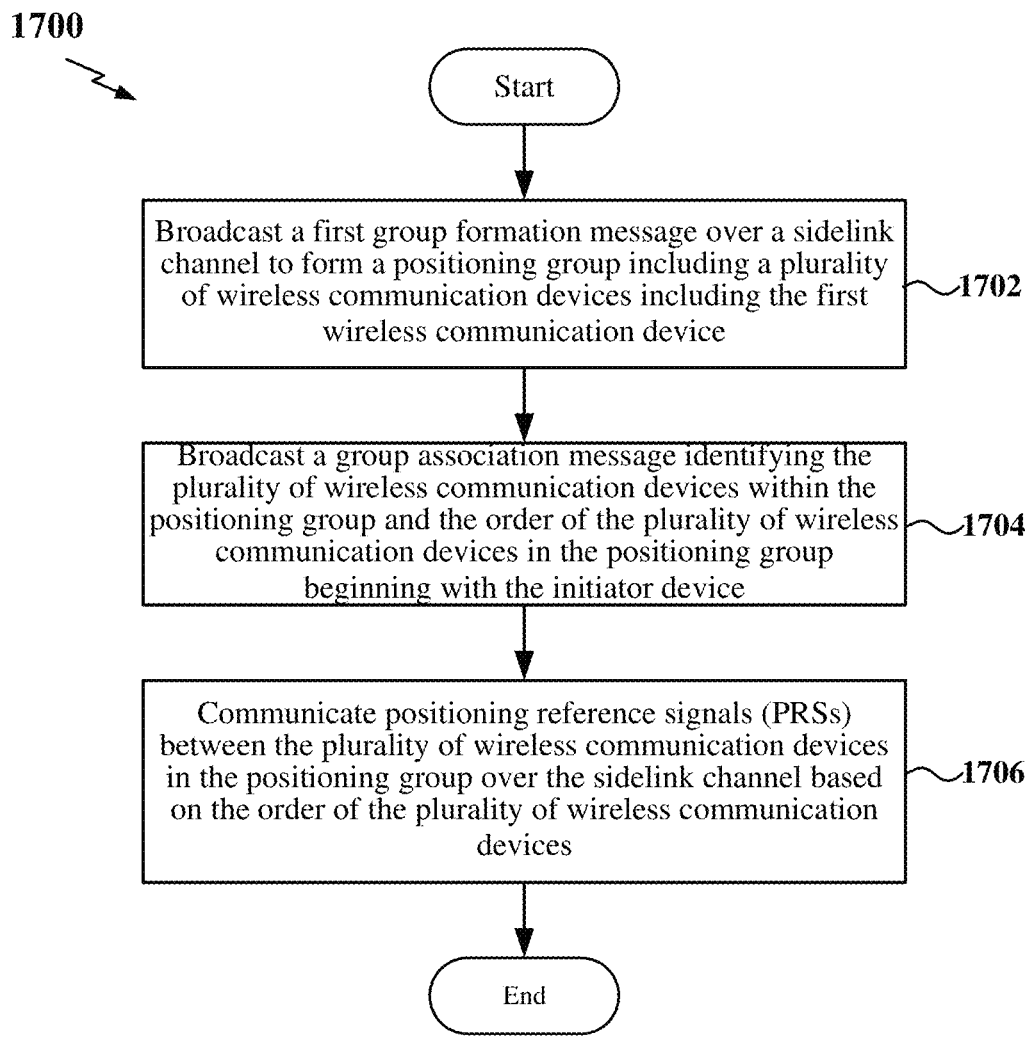
FIG. 17 is a flow chart of another exemplary method for group-based PRS broadcast according to some aspects.

FIG. 17 is a flow chart of another exemplary method 1700 for group-based PRS broadcast according to some aspects. As described below, some or all illustrated features may be omitted in a particular implementation within the scope of the present disclosure, and some illustrated features may not be required for implementation of all examples. In some examples, the method may be performed by the wireless communication device 1200, as described above and illustrated in FIG. 12, by a processor or processing system, or by any suitable means for carrying out the described functions.

At block 1702, the wireless communication device (e.g., a first wireless communication device) may broadcast a first group formation message to form a positioning group including a plurality of wireless communication devices including the first wireless communication device. The first wireless communication device may broadcast the first group formation message during a group phase in a time domain. The group phase may include at least an initiator sub-phase within which initiator devices can broadcast respective group formation messages and a responder sub-phase within which responder devices can broadcast respective other group formation messages. The initiator devices may include at least anchor devices, each having a respective known location based on a location accuracy. The responder devices include at least non-anchor devices, each having a respective unknown location based on the location accuracy.

In some examples, the first wireless communication device may broadcast the first group formation message during the initiator sub-phase when the first wireless communication device is one of the anchor devices to identify the first wireless communication device as an initiator device for the positioning group. In some examples, the first wireless communication device may receive a second group formation message during the initiator sub-phase from a second wireless communication device, compare a received power of the second group formation message with a threshold, and broadcast the first group formation message during the initiator sub-phase when the received power is less than the threshold. In this example, the first wireless communication device may exclude the second wireless communication device from the positioning group.

In some examples, the first wireless communication device may receive a third group formation message from a third wireless communication device within the responder sub-phase. The third wireless communication device may be one of the responder devices. The first wireless communication device may further include the third wireless communication device in the positioning group. In some examples, the third wireless communication device may be one of the non-anchor devices or another one of the anchor devices.

In some examples, each of a plurality of group formation messages, including the first and third group formation messages, includes initiator information indicating whether a transmitting device of a respective group formation message of the plurality of group formation messages is the initiator device of the positioning group, anchor information indicating whether the transmitting device is one of the anchor devices, power information indicating whether the transmitting device is power limited, and a group identity (ID) identifying the transmitting device within the positioning group. In some examples, the group ID includes a random number. In some examples, the third group formation message further includes an initiator ID of the initiator device of the positioning group, and respective responder IDs of each of the responder devices that broadcast the respective group formation messages within the responder sub-phase prior to the third group formation message. In some examples, the initiator ID is based on the group ID of the initiator device and each of the responder IDs are based on the respective group IDs of each of the responder devices. For example, the group formation circuitry 1244, together with the communication and processing circuitry 1242 and transceiver 1210, shown and described above in connection with FIG. 12, may provide a means to broadcast the first group formation message.

At block 1704, the first wireless communication device may broadcast a group association message identifying the plurality of wireless communication devices within the positioning group and the order of the plurality of wireless communication devices in the positioning group beginning with the initiator device. In some examples, each of the plurality of group formation messages includes a basic field value produced as a composite of the initiator information, the anchor information, the power information, and the group ID, and the order of the plurality of wireless communication devices is listed in the group association message in decreasing order of the respective basic field values associated with each of the plurality of wireless communication devices. In some examples, the group association message includes the respective responder IDs of each of the plurality of wireless communication devices in the positioning group. For example, the group formation circuitry 1244, together with the communication and processing circuitry 1242 and transceiver 1210, shown and described above in connection with FIG. 12, may provide a means to broadcast the group association message.

At block 1706, the first wireless communication device may communicate positioning reference signals (PRSs) between the plurality of wireless communication devices in the positioning group over the sidelink channel based on the order of the plurality of wireless communication devices in the positioning group. For example, the PRS generation circuitry 1246, together with the communication and processing circuitry 1242 and transceiver 1210, shown and described above in connection with FIG. 12 may provide a means to communicate PRSs based on the order.

Figure 18:
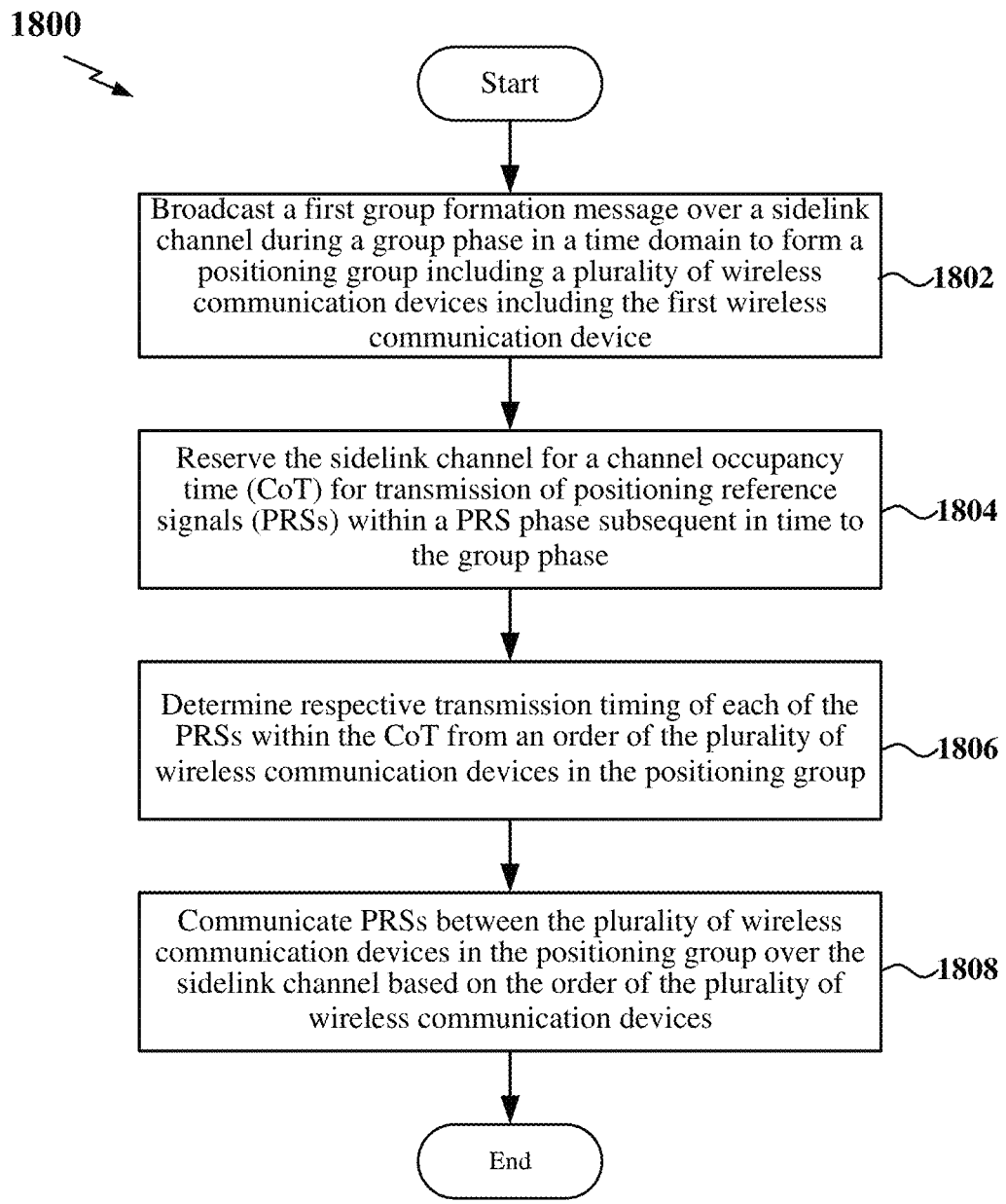
FIG. 18 is a flow chart of another exemplary method for group-based PRS broadcast according to some aspects.

FIG. 18 is a flow chart of another exemplary method 1800 for group-based PRS broadcast according to some aspects. As described below, some or all illustrated features may be omitted in a particular implementation within the scope of the present disclosure, and some illustrated features may not be required for implementation of all examples. In some examples, the method may be performed by the wireless communication device 1200, as described above and illustrated in FIG. 12, by a processor or processing system, or by any suitable means for carrying out the described functions.

At block 1802, the wireless communication device (e.g., a first wireless communication device) may broadcast a first group formation message during a group phase in a time domain to form a positioning group including a plurality of wireless communication devices including the first wireless communication device. The group phase may include at least an initiator sub-phase within which initiator devices can broadcast respective group formation messages and a responder sub-phase within which responder devices can broadcast respective other group formation messages. The initiator devices may include at least anchor devices, each having a respective known location based on a location accuracy. The responder devices include at least non-anchor devices, each having a respective unknown location based on the location accuracy. For example, the group formation circuitry 1244, together with the communication and processing circuitry 1242 and transceiver 1210, shown and described above in connection with FIG. 12, may provide a means to broadcast the first group formation message.

At block 1804, the first wireless communication device may reserve the sidelink channel for a channel occupancy time (CoT) for transmission of positioning reference signals (PRSs) within a PRS phase subsequent in time to the group phase. For example, the group formation circuitry 1244, together with the communication and processing circuitry 1242 and transceiver 1210, shown and described above in connection with FIG. 12, may provide a means to reserve the sidelink channel.

At block 1806, the first wireless communication device may determine respective transmission timing of each of the PRSs within the CoT from an order of the plurality of wireless communication devices in the positioning group. For example, the group formation circuitry 1244 shown and described above in connection with FIG. 12 may provide a means to determine the respective transmission timing of the PRSs.

At block 1808, the first wireless communication device may communicate PRSs between the plurality of wireless communication devices in the positioning group over the sidelink channel based on the order of the plurality of wireless communication devices. For example, the PRS generation circuitry 1246, together with the communication and processing circuitry 1242 and transceiver 1210, shown and described above in connection with FIG. 12 may provide a means to communicate PRSs based on the order.

Figure 19:
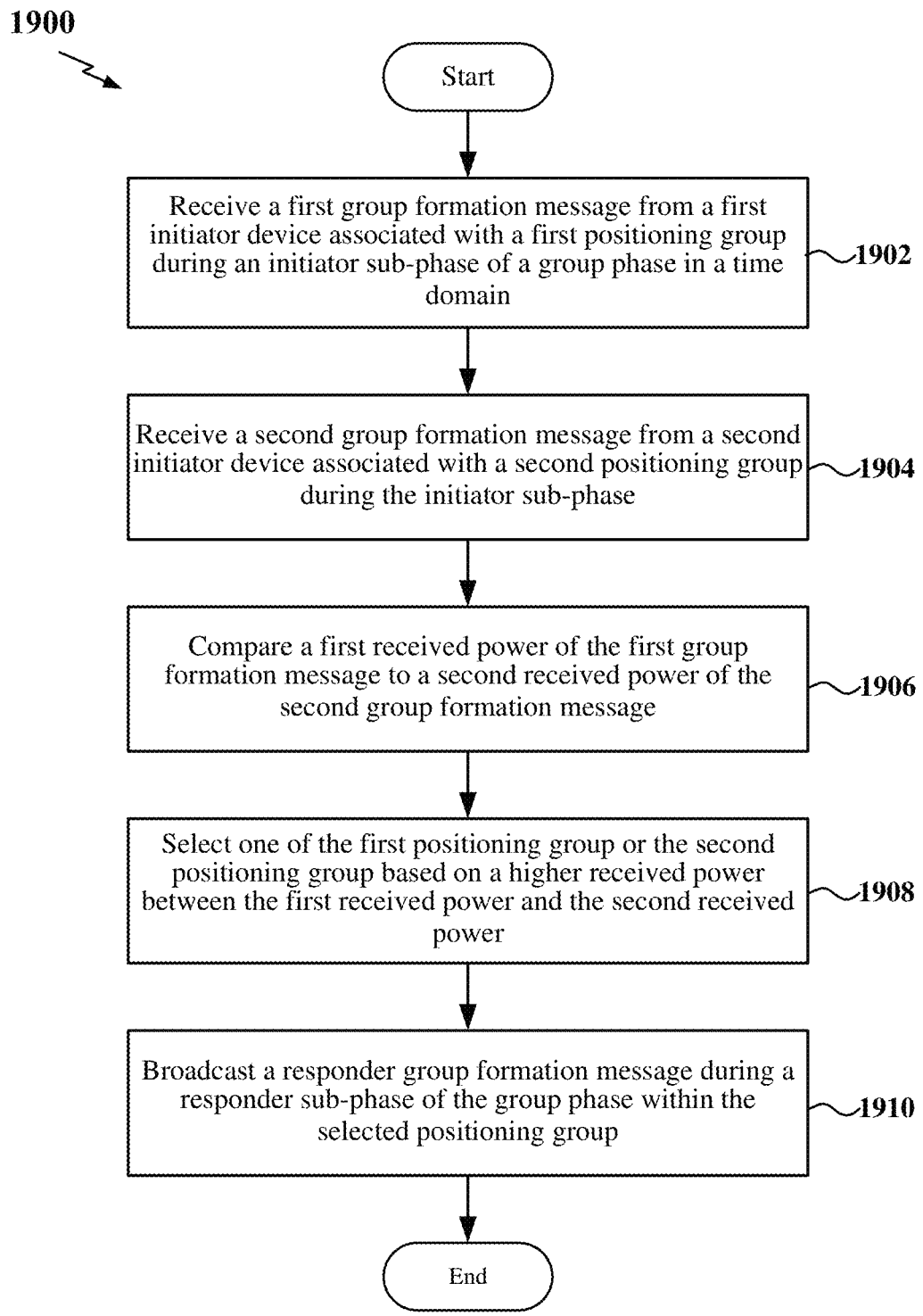
FIG. 19 is a flow chart of another exemplary method for group-based PRS broadcast according to some aspects.

FIG. 19 is a flow chart of another exemplary method 1900 for group-based PRS broadcast according to some aspects. As described below, some or all illustrated features may be omitted in a particular implementation within the scope of the present disclosure, and some illustrated features may not be required for implementation of all examples. In some examples, the method may be performed by the wireless communication device 1200, as described above and illustrated in FIG. 12, by a processor or processing system, or by any suitable means for carrying out the described functions.

At block 1902, the wireless communication device (e.g., a first wireless communication device) may receive a first group formation message from a first initiator device associated with a first positioning group during an initiator sub-phase of a group phase in a time domain. The initiator sub-phase may be a duration of time within which initiator devices can broadcast respective group formation messages. The initiator devices may include at least anchor devices, each having a respective known location based on a location accuracy. The group phase may further include a responder sub-phase within which responder devices can broadcast respective other group formation messages. The responder devices include at least non-anchor devices, each having a respective unknown location based on the location accuracy. For example, the group formation circuitry 1244, together with the communication and processing circuitry 1242 and transceiver 1210, shown and described above in connection with FIG. 12, may provide a means to receive the first group formation message.

At block 1904, the first wireless communication device may receive a second group formation message from a second initiator device associated with a second positioning group during the initiator sub-phase. For example, the group formation circuitry 1244, together with the communication and processing circuitry 1242 and transceiver 1210, shown and described above in connection with FIG. 12, may provide a means to receive the second group formation message.

At block 1906, the first wireless communication device may compare a first received power of the first group formation message to a second received power of the second group formation message. For example, the group formation circuitry 1244 shown and described above in connection with FIG. 12 may provide a means to compare the received powers of the group formation messages.

At block 1908, the first wireless communication device may select one of the first positioning group or the second positioning group based on a higher received power between the first received power and the second received power. For example, the group formation circuitry 1244 shown and described above in connection with FIG. 12 may provide a means to select one of the positioning groups.

At block 1910, the first wireless communication device may broadcast a responder group formation message during a responder sub-phase of the group phase within the selected positioning group. For example, the group formation circuitry 1244, together with the communication and processing circuitry 1242 and transceiver 1210, shown and described above in connection with FIG. 12, may provide a means to broadcast the responder group formation message.

Figure 20:
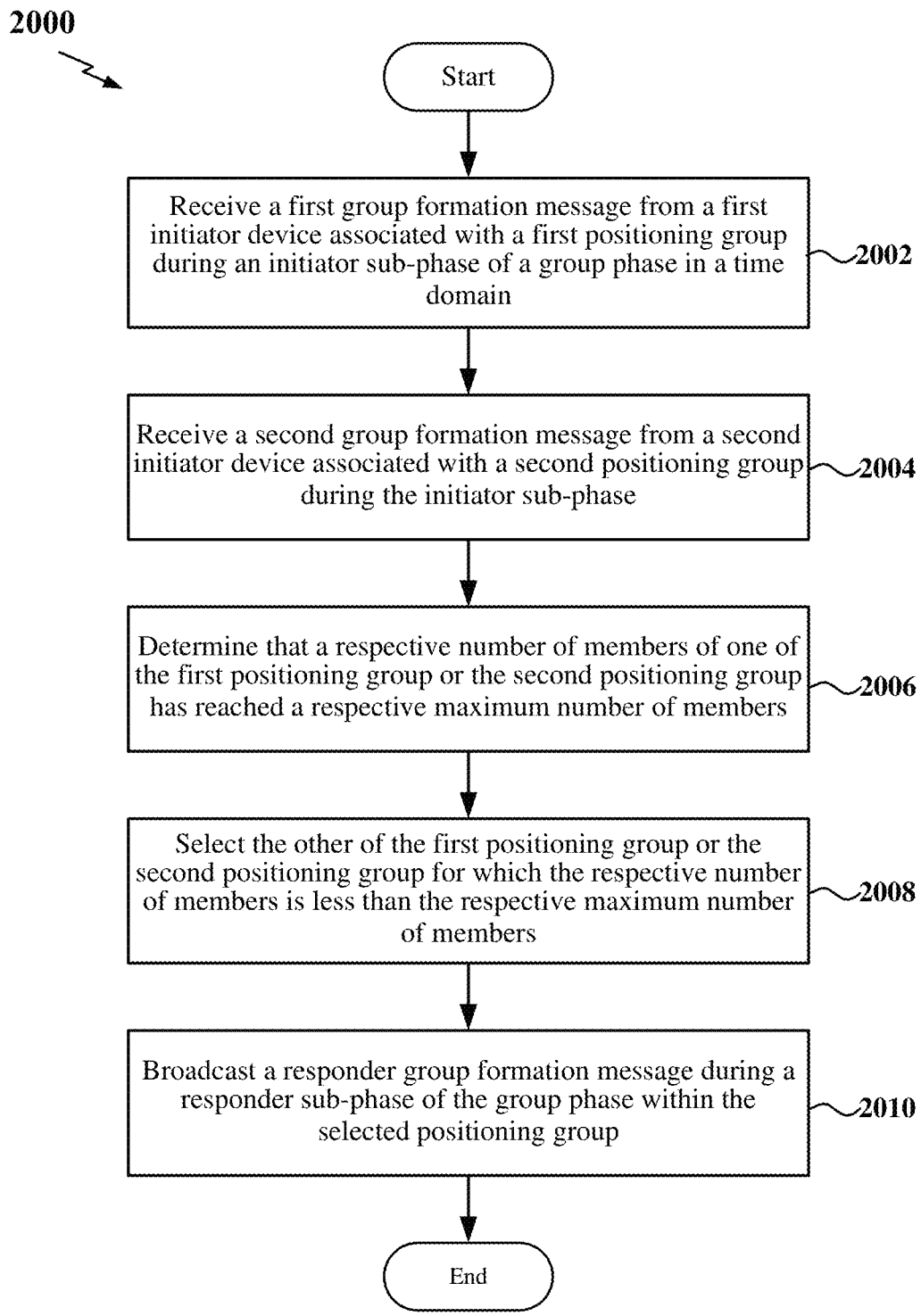
FIG. 20 is a flow chart of another exemplary method for group-based PRS broadcast according to some aspects.

FIG. 20 is a flow chart of another exemplary method 2000 for group-based PRS broadcast according to some aspects. As described below, some or all illustrated features may be omitted in a particular implementation within the scope of the present disclosure, and some illustrated features may not be required for implementation of all examples. In some examples, the method may be performed by the wireless communication device 1200, as described above and illustrated in FIG. 12, by a processor or processing system, or by any suitable means for carrying out the described functions.

At block 2002, the wireless communication device (e.g., a first wireless communication device) may receive a first group formation message from a first initiator device associated with a first positioning group during an initiator sub-phase of a group phase in a time domain. The initiator sub-phase may be a duration of time within which initiator devices can broadcast respective group formation messages. The initiator devices may include at least anchor devices, each having a respective known location based on a location accuracy. The group phase may further include a responder sub-phase within which responder devices can broadcast respective other group formation messages. The responder devices include at least non-anchor devices, each having a respective unknown location based on the location accuracy. For example, the group formation circuitry 1244, together with the communication and processing circuitry 1242 and transceiver 1210, shown and described above in connection with FIG. 12, may provide a means to receive the first group formation message.

At block 2004, the first wireless communication device may receive a second group formation message from a second initiator device associated with a second positioning group during the initiator sub-phase. For example, the group formation circuitry 1244, together with the communication and processing circuitry 1242 and transceiver 1210, shown and described above in connection with FIG. 12, may provide a means to receive the second group formation message.

At block 2006, the first wireless communication device may determine that a respective number of members of one of the first positioning group or the second positioning group has reached a respective maximum number of members. For example, the group formation circuitry 1244 shown and described above in connection with FIG. 12 may provide a means to determine the respective number of members of one of the positioning groups has reached a maximum number.

At block 2008, the first wireless communication device may select the other of the first positioning group or the second positioning group for which the respective number of members is less than the respective maximum number of members. For example, the group formation circuitry 1244 shown and described above in connection with FIG. 12 may provide a means to select the other positioning group.

At block 2010, the first wireless communication device may broadcast a responder group formation message during a responder sub-phase of the group phase within the selected positioning group. For example, the group formation circuitry 1244, together with the communication and processing circuitry 1242 and transceiver 1210, shown and described above in connection with FIG. 12, may provide a means to broadcast the responder group formation message.

In one configuration, the wireless communication device 1200 includes means for group-based PRS broadcast as described in the present disclosure. In one aspect, the aforementioned means may be the processor 1204 shown in FIG. 12 configured to perform the functions recited by the aforementioned means. In another aspect, the aforementioned means may be a circuit or any apparatus configured to perform the functions recited by the aforementioned means.

Of course, in the above examples, the circuitry included in the processor 1204 is merely provided as an example, and other means for carrying out the described functions may be included within various aspects of the present disclosure, including but not limited to the instructions stored in the computer-readable storage medium 1206, or any other suitable apparatus or means described in any one of the FIGS. 1-5, 10, and/or 12, and utilizing, for example, the processes and/or algorithms described herein in relation to FIGS. 13-20.

The processes shown in FIGS. 5 and 13-19 may include additional aspects, such as any single aspect or any combination of aspects described below and/or in connection with one or more other processes described elsewhere herein.

Aspect 1: A method of wireless communication, the method comprising, at a first wireless communication device: broadcasting a first group formation message over a sidelink channel to form a positioning group comprising a plurality of wireless communication devices including the first wireless communication device; and communicating positioning reference signals (PRSs) between the plurality of wireless communication devices in the positioning group over the sidelink channel based on an order of the plurality of wireless communication devices in the positioning group.

Aspect 2: The method of aspect 1, wherein the broadcasting the first group formation message further comprises: broadcasting the first group formation message during a group phase in a time domain, the group phase comprising at least an initiator sub-phase within which initiator devices can broadcast respective group formation messages and a responder sub-phase within which responder devices can broadcast respective group formation messages.

Aspect 3: The method of aspect 2, wherein: the initiator devices comprise at least anchor devices, each comprising a respective known location based on a location accuracy, and the responder devices comprise at least non-anchor devices, each comprising a respective unknown location based on the location accuracy.

Aspect 4: The method of aspect 3, wherein the broadcasting the first group formation message within the group phase further comprises broadcasting the first group formation message within the initiator sub-phase based on the first wireless communication device being one of the anchor devices to identify the first wireless communication device as an initiator device for the positioning group.

Aspect 5: The method of aspect 4, wherein the broadcasting the first group formation message within the initiator sub-phase further comprising: receiving a second group formation message within the initiator sub-phase from a second wireless communication device; comparing a received power of the second group formation message with a threshold; and broadcasting the first group formation message within the initiator sub-phase in response to the received power being less than the threshold.

Aspect 6: The method of aspect 5, further comprising: excluding the second wireless communication device from the positioning group.

Aspect 7: The method of any of aspects 4 through 6, further comprising: receiving a third group formation message from a third wireless communication device within the responder sub-phase, wherein the third wireless communication device is one of the responder devices; and including the third wireless communication device in the positioning group.

Aspect 8: The method of aspect 7, wherein the third wireless communication device is one of the non-anchor devices or another one of the anchor devices.

Aspect 9: The method of aspect 7 or 8, wherein each of a plurality of group formation messages comprising the first group formation message and the third group formation message comprise: initiator information indicating whether a transmitting device of a respective group formation message of the plurality of group formation messages is the initiator device of the positioning group, anchor information indicating whether the transmitting device is one of the anchor devices, power information indicating whether the transmitting device is power limited, and a group identity (ID) identifying the transmitting device within the positioning group.

Aspect 10: The method of aspect 9, wherein the group ID comprises a random number.

Aspect 11: The method of aspect 9 or 10, wherein the third group formation message further comprises: an initiator ID of the initiator device of the positioning group, and respective responder IDs of each of the responder devices that broadcast the respective group formation messages within the responder sub-phase prior to the third group formation message.

Aspect 12: The method of aspect 11, wherein the initiator ID is based on the group ID of the initiator device and each of the responder IDs are based on the respective group IDs of each of the responder devices.

Aspect 13: The method of aspect 11 or 12, further comprising: broadcasting a group association message identifying the plurality of wireless communication devices within the group and the order of the plurality of wireless communication devices in the positioning group beginning with the initiator device.

Aspect 14: The method of aspect 13, wherein: each of the plurality of group formation messages comprises a basic field value produced as a composite of the initiator information, the anchor information, the power information, and the group ID, and the order of the plurality of wireless communication devices is listed in the group association message in decreasing order of the respective basic field values associated with each of the plurality of wireless communication devices.

Aspect 15: The method of aspect 14, wherein the group association message comprises the respective responder IDs of each of the plurality of wireless communication devices in the positioning group.

Aspect 16: The method of any of aspects 4 through 15, further comprising: reserving the sidelink channel for a channel occupancy time (CoT) for transmission of the PRSs within a PRS phase subsequent in time to the group phase.

Aspect 17: The method of aspect 16, further comprising: determining respective transmission timing of each of the PRSs within the CoT from the order of the plurality of wireless communication devices.

Aspect 18: The method of aspect 3, wherein the broadcasting the first group formation message within the group phase further comprises: broadcasting the first group formation message during the responder sub-phase based on the first wireless communication device being a responder device of the responder devices for the positioning group.

Aspect 19: The method of aspect 18, wherein the first wireless communication device is one of the non-anchor devices or one of the anchor devices.

Aspect 20: The method of aspect 18 or 19, further comprising: receiving a fourth group formation message within the initiator sub-phase from a first initiator device of the initiator devices associated with a first positioning group; and receiving a fifth group formation message within the initiator sub-phase from a second initiator device of the initiator devices associated with a second positioning group.

Aspect 21: The method of aspect 20, further comprising: comparing a first received power of the fourth group formation message to a second received power of the fifth group formation message; and selecting one of the first positioning group or the second positioning group within which to broadcast the first group formation message based on a higher received power at the first wireless communication device between the first received power and the second received power.

Aspect 22: The method of aspect 20, further comprising: determining that a respective number of members of one of the first positioning group or the second positioning group has reached a respective maximum number of members; and selecting the other of the first positioning group or the second positioning group for which the respective number of members is less than the respective maximum number of members.

Aspect 23: The method of aspect 3, wherein the broadcasting the first group formation message within the group phase further comprises: determining that no group formation messages were received within the initiator sub-phase; and broadcasting the first group formation message within the responder sub-phase based on the first wireless communication device being one of the non-anchor devices to identify the first wireless communication device as an initiator device for the positioning group.

Aspect 24: A first wireless communication device in a wireless communication network comprising a wireless transceiver, a memory, and a processor coupled to the wireless transceiver and the memory, the processor and the memory configured to perform a method of any one of aspects 1 through 23.

Aspect 25: A first wireless communication device in a wireless communication network comprising at least one means for performing a method of any one of aspects 1 through 23.

Aspect 26: An article of manufacture for use by a first wireless communication device in a wireless communication network. The article includes a computer-readable medium having stored therein instructions executable by one or more processors of the first wireless communication device to perform a method of any one of aspects 1 through 23.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-20 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-5, 10 and/or 12 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A first wireless communication device in a wireless communication network, comprising:
   a wireless transceiver;
   a memory; and
   a processor communicatively coupled to the wireless transceiver and the memory, wherein the processor and the memory are configured to:
   broadcast a first group formation message over a sidelink channel via the wireless transceiver to form a positioning group comprising a plurality of wireless communication devices including the first wireless communication device, the first group formation message being broadcast during a group phase in a time domain, the group phase comprising at least an initiator sub-phase within which initiator devices can broadcast respective group formation messages and a responder sub-phase within which responder devices can broadcast respective other group formation messages; and
   communicate positioning reference signals (PRSs) between the plurality of wireless communication devices in the positioning group over the sidelink channel via the wireless transceiver based on an order of the plurality of wireless communication devices in the positioning group.

2. The first wireless communication device of claim 1, wherein:
   the initiator devices comprise at least anchor devices, each comprising a respective known location based on a location accuracy, and
   the responder devices comprise at least non-anchor devices, each comprising a respective unknown location based on the location accuracy.

3. The first wireless communication device of claim 2, wherein the processor and the memory are further configured to:
   broadcast the first group formation message during the initiator sub-phase based on the first wireless communication device being one of the anchor devices to identify the first wireless communication device as an initiator device for the positioning group.

4. The first wireless communication device of claim 3, wherein the processor and the memory are further configured to:
   receive a second group formation message during the initiator sub-phase from a second wireless communication device;
   compare a received power of the second group formation message with a threshold; and
   broadcast the first group formation message during the initiator sub-phase in response to the received power being less than the threshold.

5. The first wireless communication device of claim 4, wherein the processor and the memory are further configured to:
   exclude the second wireless communication device from the positioning group.

6. The first wireless communication device of claim 3, wherein the processor and the memory are further configured to:
   receive a third group formation message from a third wireless communication device within the responder sub-phase, wherein the third wireless communication device is one of the responder devices; and
   include the third wireless communication device in the positioning group.

7. The first wireless communication device of claim 6, wherein the third wireless communication device is one of the non-anchor devices or another one of the anchor devices.

8. The first wireless communication device of claim 6, wherein each of a plurality of group formation messages comprising the first group formation message and the third group formation message comprise:
   initiator information indicating whether a transmitting device of a respective group formation message of the plurality of group formation messages is the initiator device of the positioning group,
   anchor information indicating whether the transmitting device is one of the anchor devices,
   power information indicating whether the transmitting device is power limited, and
   a group identity (ID) identifying the transmitting device within the positioning group.

9. The first wireless communication device of claim 8, wherein the group ID comprises a random number.

10. The first wireless communication device of claim 8, wherein the third group formation message further comprises:
    an initiator ID of the initiator device of the positioning group, and
    respective responder IDs of each of the responder devices that broadcast the respective group formation messages within the responder sub-phase prior to the third group formation message.

11. The first wireless communication device of claim 10, wherein the initiator ID is based on the group ID of the initiator device and each of the responder IDs are based on the respective group IDs of each of the responder devices.

12. The first wireless communication device of claim 10, wherein the processor and the memory are further configured to:
broadcast a group association message identifying the plurality of wireless communication devices within the positioning group and the order of the plurality of wireless communication devices in the positioning group beginning with the initiator device.

13. The first wireless communication device of claim 12, wherein:
each of the plurality of group formation messages comprises a basic field value produced as a composite of the initiator information, the anchor information, the power information, and the group ID, and
the order of the plurality of wireless communication devices is listed in the group association message in decreasing order of the respective basic field values associated with each of the plurality of wireless communication devices.

14. The first wireless communication device of claim 13, wherein the group association message comprises the respective responder IDs of each of the plurality of wireless communication devices in the positioning group.

15. The first wireless communication device of claim 3, wherein the processor and the memory are further configured to:
reserve the sidelink channel for a channel occupancy time (CoT) for transmission of the PRSs within a PRS phase subsequent in time to the group phase.

16. The first wireless communication device of claim 15, wherein the processor and the memory are further configured to:
determine respective transmission timing of each of the PRSs within the CoT from the order of the plurality of wireless communication devices.

17. The first wireless communication device of claim 2, wherein the processor and the memory are further configured to:
broadcast the first group formation message during the responder sub-phase based on the first wireless communication device being a responder device of the responder devices for the positioning group.

18. The first wireless communication device of claim 17, wherein the first wireless communication device is one of the non-anchor devices or one of the anchor devices.

19. The first wireless communication device of claim 17, wherein the processor and the memory are further configured to:
receive a fourth group formation message during the initiator sub-phase from a first initiator device of the initiator devices associated with a first positioning group; and
receive a fifth group formation message during the initiator sub-phase from a second initiator device of the initiator devices associated with a second positioning group.

20. The first wireless communication device of claim 19, wherein the processor and the memory are further configured to:
compare a first received power of the fourth group formation message to a second received power of the fifth group formation message; and
select one of the first positioning group or the second positioning group within which to broadcast the first group formation message based on a higher received power at the first wireless communication device between the first received power and the second received power.

21. The first wireless communication device of claim 19, wherein the processor and the memory are further configured to:
determine that a respective number of members of one of the first positioning group or the second positioning group has reached a respective maximum number of members; and
select the other of the first positioning group or the second positioning group for which the respective number of members is less than the respective maximum number of members.

22. The first wireless communication device of claim 2, wherein the processor and the memory are further configured to:
determine that no group formation messages were received during the initiator sub-phase; and
broadcast the first group formation message within the responder sub-phase based on the first wireless communication device being one of the non-anchor devices to identify the first wireless communication device as an initiator device for the positioning group.

23. A method of wireless communication, the method comprising, at a first wireless communication device:
broadcasting a first group formation message over a sidelink channel to form a positioning group comprising a plurality of wireless communication devices including the first wireless communication device, the first group formation message being broadcast during a group phase in a time domain, the group phase comprising at least an initiator sub-phase within which initiator devices can broadcast respective group formation messages and a responder sub-phase within which responder devices can broadcast respective other group formation messages; and
communicating positioning reference signals (PRSs) between the plurality of wireless communication devices in the positioning group over the sidelink channel based on an order of the plurality of wireless communication devices in the positioning group.

24. The method of claim 23, wherein the initiator devices comprise at least anchor devices, each comprising a respective known location based on a location accuracy, and wherein the responder devices comprise at least non-anchor devices, each comprising a respective unknown location based on the location accuracy.

25. The method of claim 24, wherein the broadcasting the first group formation message within the group phase further comprises:
broadcasting the first group formation message during the initiator sub-phase based on the first wireless communication device being one of the anchor devices to identify the first wireless communication device as an initiator device for the positioning group, and further comprising:
receiving a second group formation message from a second wireless communication device during the responder sub-phase, wherein the second wireless communication device is one of the responder devices; and
including the second wireless communication device in the positioning group wherein the second wireless communication device is one of the non-anchor devices or another one of the anchor devices.

26. The method of claim 24, wherein the broadcasting the first group formation message within the group phase further comprises:
broadcasting the first group formation message during the responder sub-phase based on the first wireless communication device being a responder device of the responder devices for the positioning group.

27. The method of claim 24, wherein the broadcasting the first group formation message within the group phase further comprises:
determining that no group formation messages were received during the initiator sub-phase; and
broadcasting the first group formation message during the responder sub-phase based on the first wireless communication device being one of the non-anchor devices to identify the first wireless communication device as an initiator device for the positioning group.

28. A first wireless communication device in a wireless communication network, comprising:
means for broadcasting a first group formation message over a sidelink channel to form a positioning group comprising a plurality of wireless communication devices including the first wireless communication device, the first group formation message being broadcast during a group phase in a time domain, the group phase comprising at least an initiator sub-phase within which initiator devices can broadcast respective group formation messages and a responder sub-phase within which responder devices can broadcast respective other group formation messages; and
means for communicating positioning reference signals (PRSs) between the plurality of wireless communication devices in the positioning group over the sidelink channel based on an order of the plurality of wireless communication devices in the positioning group.

29. The first wireless communication device of claim 28, wherein the initiator devices comprise at least anchor devices, each comprising a respective known location based on a location accuracy, and wherein the responder devices comprise at least non-anchor devices, each comprising a respective unknown location based on the location accuracy.

* * * * *